(12) United States Patent
Mameuda et al.

(10) Patent No.: US 12,556,836 B2
(45) Date of Patent: Feb. 17, 2026

(54) SEMICONDUCTOR INTEGRATED CIRCUIT, ELECTRONIC DEVICE, AND METHOD FOR CONTROLLING SEMICONDUCTOR INTEGRATED CIRCUIT

(71) Applicant: SONY SEMICONDUCTOR SOLUTIONS CORPORATION, Kanagawa (JP)

(72) Inventors: Ushio Mameuda, Kanagawa (JP); Junichiro Shirai, Kanagawa (JP); Takashi Nakamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 252 days.

(21) Appl. No.: 18/565,229

(22) PCT Filed: Dec. 28, 2021

(86) PCT No.: PCT/JP2021/048827
§ 371 (c)(1),
(2) Date: Nov. 29, 2023

(87) PCT Pub. No.: WO2022/259585
PCT Pub. Date: Dec. 15, 2022

(65) Prior Publication Data
US 2024/0292126 A1 Aug. 29, 2024

(30) Foreign Application Priority Data
Jun. 9, 2021 (JP) .................. 2021-096258

(51) Int. Cl.
*H04N 25/709* (2023.01)
*H04N 25/76* (2023.01)

(52) U.S. Cl.
CPC .......... *H04N 25/709* (2023.01); *H04N 25/76* (2023.01)

(58) Field of Classification Search
CPC ...... H04N 25/709; H04N 25/76; H04N 25/79; H03K 19/0175
See application file for complete search history.

(56) References Cited

U.S. PATENT DOCUMENTS

| 10,205,898 | B2 * | 2/2019 | McMahon | ............. H04N 25/63 |
| 12,243,897 | B2 * | 3/2025 | Suzuki | .................. H10F 39/026 |
| 2017/0131089 | A1 * | 5/2017 | Bronstein | ............ H04N 13/257 |

FOREIGN PATENT DOCUMENTS

| JP | 2003-298395 A | 10/2003 |
| JP | 2008-167286 A | 7/2008 |

(Continued)

OTHER PUBLICATIONS

International Search Report and Written Opinion of PCT Application No. PCT/JP2021/048827, issued on Mar. 22, 2022, 08 pages of ISRWO.

*Primary Examiner* — Mekonnen D Dagnew
(74) *Attorney, Agent, or Firm* — CHIP LAW GROUP

(57) ABSTRACT

Signal quality is improved in a semiconductor integrated circuit provided with a driver.
The semiconductor integrated circuit includes a driver circuit, an adjustment circuit, and a control circuit. In this semiconductor integrated circuit, the driver outputs an output signal from an output node. The adjustment circuit is provided with an adjustment-side termination resistor whose one end is connected to the output node and an adjustment transistor connected to the other end of the adjustment-side termination resistor. The control circuit controls a gate voltage of the adjustment transistor to a value corresponding to a measured temperature.

16 Claims, 26 Drawing Sheets

(56) References Cited

FOREIGN PATENT DOCUMENTS

| JP | 2008-182516 A | 8/2008 |
|---|---|---|
| JP | 2014-007654 A | 1/2014 |
| JP | 2016-525302 A | 8/2016 |

\* cited by examiner

| TEMP (MEASUREMENT CODE) | pVctl (POSITIVE-SIDE VOLTAGE CONTROL CODE) | nVctl (NEGATIVE-SIDE VOLTAGE CONTROL CODE) |
|---|---|---|
| T0 | Vdp0 | Vdn0 |
| T1 | Vdp1 | Vdn1 |
| ⋮ | ⋮ | ⋮ |

TEMPERATURE RISE ↓

POSITIVE-SIDE RISE
NEGATIVE-SIDE DROP ↓

| TEMP (MEASUREMENT CODE) | pVctl (POSITIVE-SIDE VOLTAGE CONTROL CODE) | nVctl (NEGATIVE-SIDE VOLTAGE CONTROL CODE) | Cctl0 (NUMBER-OF- ADJUSTMENT-UNITS CONTROL SIGNAL) | xCctl0 (NUMBER-OF- ADJUSTMENT-UNITS CONTROL SIGNAL) | ... |
|---|---|---|---|---|---|
| T0 | Vdp0 | Vdn0 | 0 | 1 | ... |
| T1 | Vdp1 | Vdn1 | 0 | 1 | ... |
| ⋮ | ⋮ | ⋮ | ⋮ | ⋮ | |

SEMICONDUCTOR INTEGRATED CIRCUIT, ELECTRONIC DEVICE, AND METHOD FOR CONTROLLING SEMICONDUCTOR INTEGRATED CIRCUIT

CROSS REFERENCE TO RELATED APPLICATIONS

This application is a U.S. National Phase of International Patent Application No. PCT/JP2021/048827 filed on Dec. 28, 2021, which claims priority benefit of Japanese Patent Application No. JP 2021-096258 filed in the Japan Patent Office on Jun. 9, 2021. Each of the above-referenced applications is hereby incorporated herein by reference in its entirety.

TECHNICAL FIELD

The present technology relates to a semiconductor integrated circuit. Specifically, the present invention relates to a semiconductor integrated circuit provided with an interface circuit, an electronic device, and a method for controlling a semiconductor integrated circuit.

BACKGROUND ART

Conventionally, a driver has been used to output a transmission signal on a transmission side of an interface circuit. A resistance value of a termination resistance on the transmission side may vary depending on a process, a voltage, or a temperature. In this regard, there is proposed an interface circuit in which a plurality of transistors is arranged in a driver and a calibration circuit controls the number of transistors to be turned on (see, for example, Patent Document 1).

CITATION LIST

Patent Document

Patent Document 1: Japanese Patent Application Laid-Open No. 2008-182516

SUMMARY OF THE INVENTION

Problems to be Solved by the Invention

In the above-described related art, a variation of a termination resistance is adjusted by controlling the number of transistors to be turned on. In this related art, however, the termination resistance can be adjusted only in a stepwise manner, and thus, it may be difficult to adjust the variation of the termination resistance caused by a temperature change in a case where the temperature fluctuates suddenly or in a case where the amount of the fluctuation is great. In this manner, it may be difficult to sufficiently adjust the variation of the termination resistance in the above-described related art, and there is a possibility that quality of a signal output from the driver is deteriorated.

The present technology has been made in view of such a situation, and an object thereof is to improve signal quality in a semiconductor integrated circuit provided with a driver.

Solutions to Problems

The present technology has been made to solve the above-described problem, and a first aspect thereof is a semiconductor integrated circuit and a method for controlling the same, the semiconductor integrated circuit including: a driver that outputs an output signal from an output node; an adjustment circuit provided with an adjustment-side termination resistor whose one end is connected to the output node and an adjustment transistor connected to the other end of the adjustment-side termination resistor; and a control circuit that controls a gate voltage of the adjustment transistor to a value corresponding to a measured temperature. This brings about an effect that a variation of a termination resistance due to the temperature is adjusted.

Furthermore, in the first aspect, the adjustment transistor may include a positive-side adjustment transistor and a negative-side adjustment transistor, the gate voltage may include a positive-side voltage and a negative-side voltage, and the control circuit may supply a voltage, which is higher as the temperature is higher, to a gate of the positive adjustment transistor as the positive-side voltage and supply a voltage, which is lower as the temperature is higher, to a gate of the negative adjustment transistor as the negative-side voltage. This brings about an effect that variations having positive and negative temperature characteristics are adjusted.

Furthermore, in the first aspect, the control circuit may supply a voltage, which is higher as the temperature is higher, to a gate of the adjustment transistor. This brings about an effect that a variation having a positive temperature characteristic is adjusted.

Furthermore, in the first aspect, the control circuit may supply a voltage, which is lower as the temperature is higher, to a gate of the adjustment transistor. This brings about an effect that a variation having a negative temperature characteristic is adjusted.

Furthermore, in the first aspect, the adjustment circuit may include a plurality of adjustment units commonly connected to the output node, and the adjustment transistor and the adjustment-side termination resistor may be arranged in each of the plurality of adjustment units. This brings about an effect that a control range of the gate voltage can be narrowed.

Furthermore, in the first aspect, the control circuit may further control the number of units to be driven among the plurality of adjustment units. This brings about an effect that the capability of adjusting a termination resistance according to the temperature can be made variable.

Furthermore, in the first aspect, a power-supply-side regulator that suppresses a fluctuation of a power supply voltage of each of the driver and the adjustment circuit may be further included. This brings about an effect that the fluctuation of the power supply voltage is suppressed.

Furthermore, in the first aspect, a ground-side regulator that suppresses a fluctuation of a ground voltage of each of the driver and the adjustment circuit may be further included. This brings about an effect that the fluctuation of the ground voltage is suppressed.

Furthermore, in the first aspect, a power-supply-side regulator that suppresses a fluctuation of a power supply voltage of each of the driver and the adjustment circuit, and a ground-side regulator that suppresses a fluctuation of a ground voltage of each of the driver and the adjustment circuit may be further provided. This brings about an effect that the fluctuations of the power supply voltage and the ground voltage are suppressed.

Furthermore, in the first aspect, a differential signal may be input to the driver as an input signal, and the driver may output a differential signal as the output signal on the basis of the input signal. This brings about an effect that signal quality is improved.

Furthermore, in the first aspect, the driver may include a plurality of driver units, and a predetermined number of driver units among the plurality of driver units may be driven in accordance with a predetermined control signal. This brings about an effect that a variation due to a process is adjusted.

Furthermore, in the first aspect, each of the plurality of driver units may include: a p-channel metal oxide semiconductor (pMOS) transistor and an n-channel MOS (nMOS) transistor which are connected in series between a power supply node and a ground node; and a driver-side termination resistor inserted between the output node and a connection node between the pMOS transistor and the nMOS transistor. This brings about an effect that a signal is inverted.

Furthermore, in the first aspect, each of the plurality of driver units may include: a pair of nMOS transistors connected in series between a power supply node and a ground node; and a driver-side termination resistor inserted between the output node and a connection node of the pair of nMOS transistors. This brings about an effect that only the nMOS transistors are arranged in the driver.

Furthermore, in the first aspect, each of the plurality of driver units may include: a pair of pMOS transistors connected in series between a power supply node and a ground node; and a driver-side termination resistor inserted between the output node and a connection node of the pair of pMOS transistors. This brings about an effect that only the pMOS transistors are arranged in the driver.

Furthermore, a second aspect of the present technology is an electronic device including: a driver that outputs an output signal from an output node; an adjustment circuit provided with an adjustment-side termination resistor whose one end is connected to the output node and an adjustment transistor connected to another end of the adjustment-side termination resistor; a control circuit that controls a gate voltage of the adjustment transistor to a value corresponding to a measured temperature; and a reception circuit that receives the output signal. This brings about an effect that a variation of a termination resistance due to the temperature is adjusted in the electronic device.

BRIEF DESCRIPTION OF DRAWINGS

FIG. 8 is a view illustrating a configuration example of a conversion table in the first embodiment of the present technology.

FIG. 16 is a view illustrating a configuration example of a conversion table in the third embodiment of the present technology.

MODE FOR CARRYING OUT THE INVENTION

Hereinafter, modes for carrying out the present technology (hereinafter referred to as embodiments) will be described. The description will be given in the following order.

Figure 1:
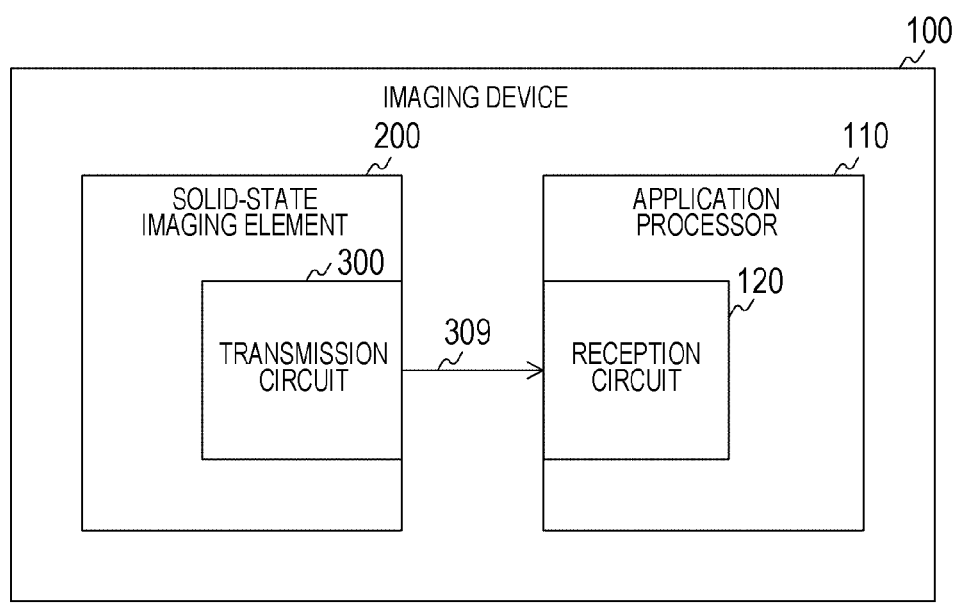
FIG. 1 is a block diagram illustrating a configuration example of an imaging device in a first embodiment of the present technology.

1. First Embodiment (Example in which Gate Voltage Is Controlled to Value Corresponding to Temperature)
2. Second Embodiment (Example in which Gate Voltage Is Controlled to Value Corresponding to Temperature for Plurality of Adjustment Units)
3. Third Embodiment (Example in which Gate Voltage Is Controlled to Value Corresponding to Temperature and Number of Adjustment Units Is Controlled)
4. Fourth Embodiment (Example in which Regulator Is Provided on Power Supply Side and Gate Voltage Is Controlled to Value Corresponding to Temperature)
5. Fifth Embodiment (Example in which Regulator Is Provided on Ground Side and Gate Voltage Is Controlled to Value Corresponding to Temperature)
6. Sixth Embodiment (Example in which Regulators Are Provided on Power Supply Side and Ground Side and Gate Voltage Is Controlled to Value Corresponding to Temperature)
7. Seventh Embodiment (Example in which N-type Transistors Are Reduced and Gate Voltage Is Controlled to Value Corresponding to Temperature)
8. Eighth Embodiment (Example in which P-type Transistors Are Reduced and Gate Voltage Is Controlled to Value Corresponding to Temperature)
9. Ninth Embodiment (Example in which Differential Driver is adopted and Gate Voltage Is Controlled to Value Corresponding to Temperature)
10. Application Example to Mobile Body 1. First Embodiment Configuration Example of Imaging Device FIG. 1 is a block diagram illustrating a configuration example of an imaging device 100 in a first embodiment of the present technology. The imaging device is a device that captures and processes image data, and includes a solid-state imaging element 200 and an application processor 110.

The solid-state imaging element 200 is configured to capture the image data by photoelectric conversion, and includes a transmission circuit 300. For example, a CMOS image sensor (CIS) is used as the solid-state imaging element 200. The transmission circuit 300 supplies the image data to the application processor 110 via a signal line 309.

The application processor 110 is configured to perform predetermined signal processing on the image data, and includes a reception circuit 120. The reception circuit 120 receives data from the transmission circuit 300.

Note that the transmission circuit 300 is arranged in the solid-state imaging element 200 in the imaging device 100, the transmission circuit 300 may be arranged in a semiconductor integrated circuit in various electronic devices other than the imaging device 100. Furthermore, the imaging device 100 is an example of an electronic device described in the claims, and the solid-state imaging element 200 is an example of the semiconductor integrated circuit described in the claims.

Configuration Example of Solid-state Imaging Element

Figure 2:
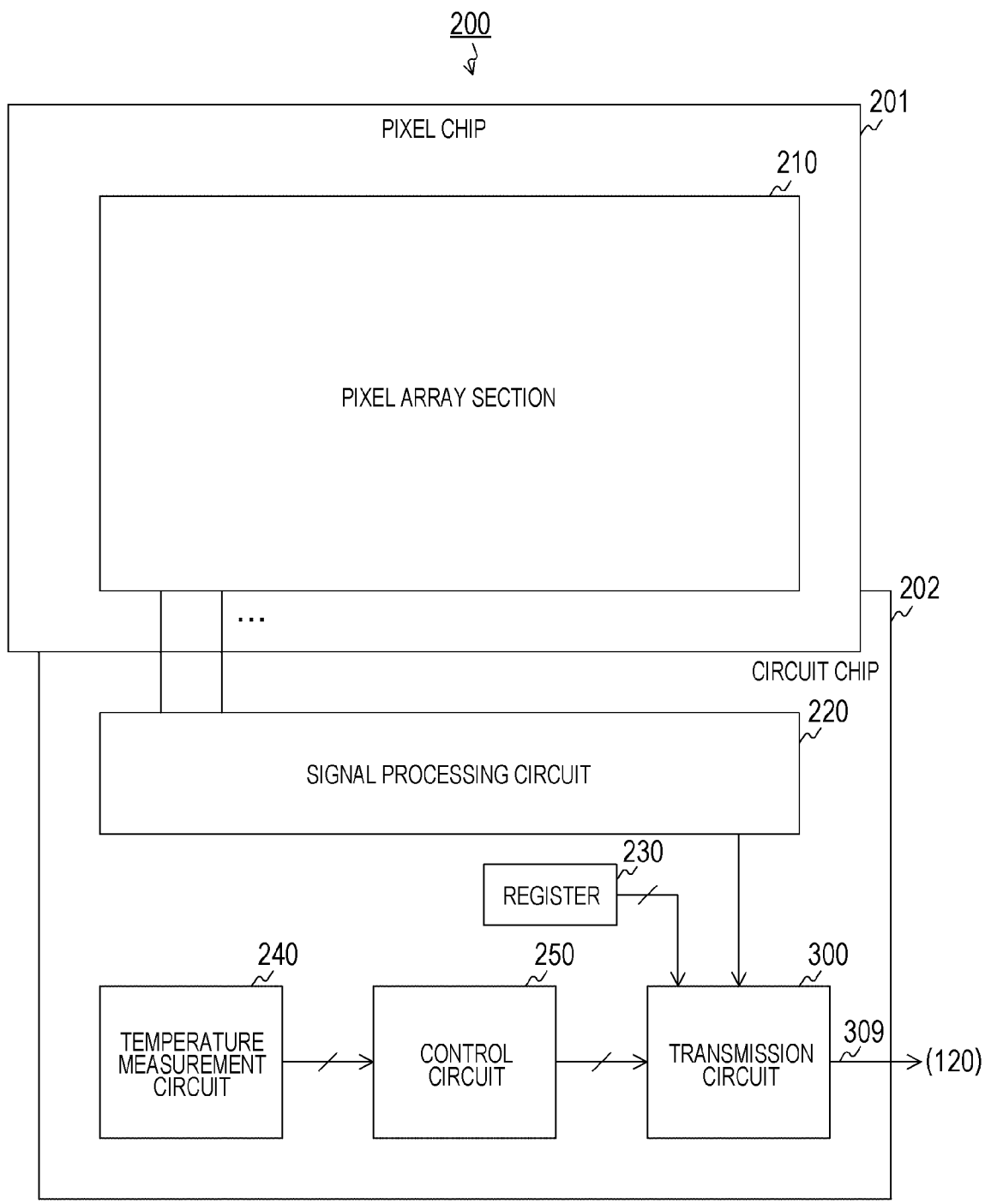
FIG. 2 is a block diagram illustrating a configuration example of a solid-state imaging element in the first embodiment of the present technology.

FIG. 2 is a block diagram depicting a configuration example of the solid-state imaging element 200 in the first embodiment of the present technology. The solid-state imaging element 200 includes a pixel chip 201 and circuit chip 202 which are stacked. These chips are electrically connected via a connection portion such as a via. Note that the connection can also be made by a Cu—Cu bonding or a bump other than the via. The connection can also be made by schemes (such as magnetic coupling) other than these. Furthermore, although the two chips are stacked, three or more layers can be stacked.

In the pixel chip 201, a pixel array section 210 in which a plurality of pixels (not illustrated) is arranged in a two-dimensional lattice pattern is arranged. Each of pixels generates a pixel signal and supplies the pixel signal to the circuit chip 202.

In the circuit chip 202, a signal processing circuit 220, a register 230, a temperature measurement circuit 240, a control circuit 250, and the transmission circuit 300 are arranged.

The signal processing circuit 220 performs predetermined signal processing on the pixel signal. Analog to digital (AD) conversion processing, correlated double sampling (CDS) processing, and the like are executed as the signal processing. The signal processing circuit 220 inputs the processed data to the transmission circuit 300 as an input signal.

The register 230 holds a control signal for controlling the number of driver units (not illustrated) to be driven in the transmission circuit 300.

The temperature measurement circuit 240 measures a temperature of the solid-state imaging element 200. For example, the temperature is periodically measured during operation of the imaging device 100. The temperature measurement circuit 240 supplies a digital signal indicating the measured temperature to the control circuit 250. The control circuit 250 controls a value of a termination resistance of the transmission circuit 300 on the basis of the measured temperature.

The transmission circuit 300 generates an output signal on the basis of the input signal from the signal processing circuit 220 and outputs the output signal to the reception circuit 120.

Configuration Examples of Temperature Measurement Circuit and Control Circuit

Figure 3:
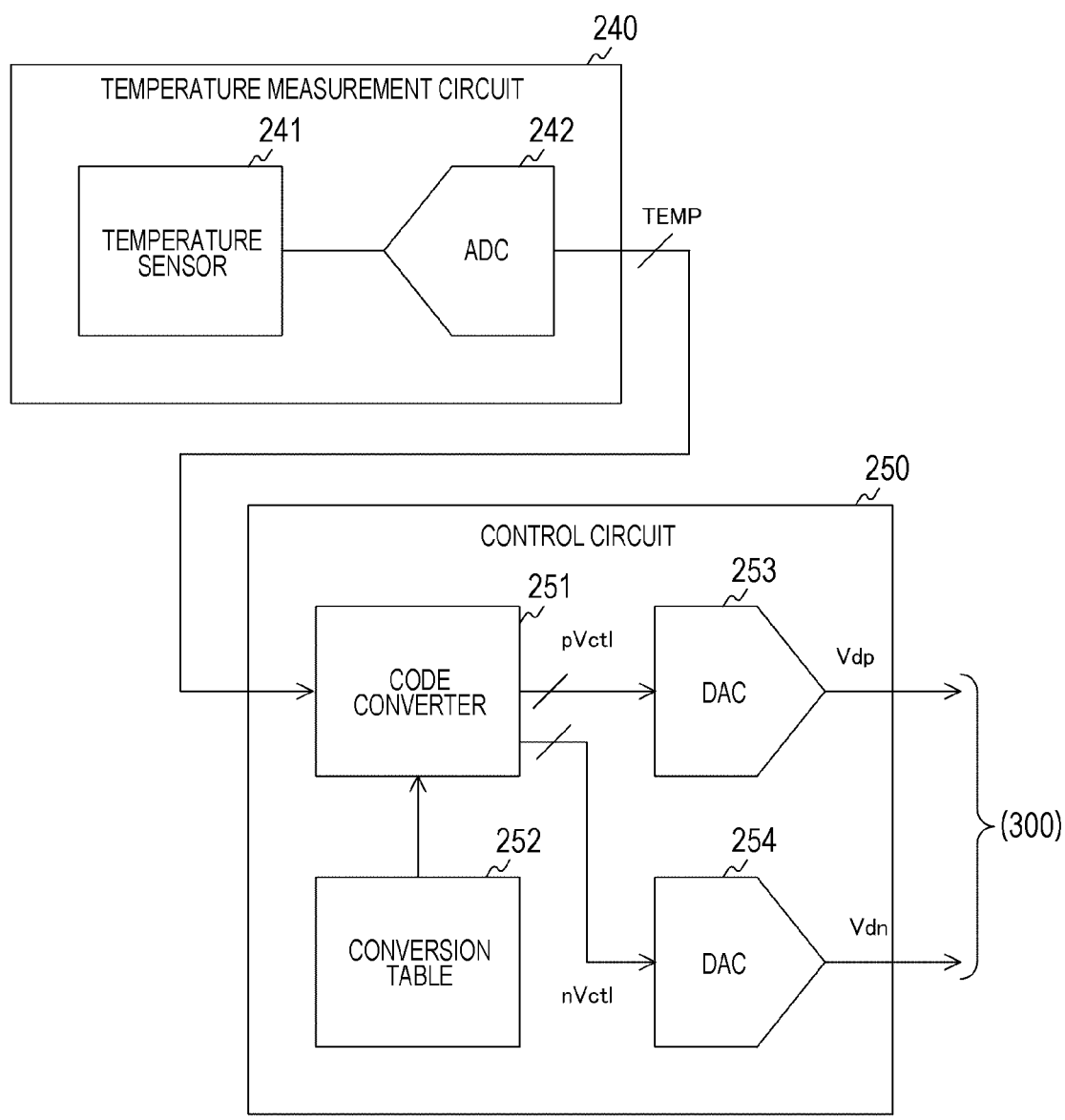
FIG. 3 is a block diagram illustrating a configuration example of a temperature measurement circuit and a control circuit in the first embodiment of the present technology.

FIG. 3 is a block diagram illustrating a configuration example of the temperature measurement circuit 240 and the control circuit 250 in the first embodiment of the present technology. The temperature measurement circuit 240 includes a temperature sensor 241 and an analog to digital converter (ADC) 242. Furthermore, the control circuit 250 includes a code converter 251, a conversion table 252, a digital to analog converter (DAC) 253, and a DAC 254.

The temperature sensor 241 measures a temperature and supplies an analog signal indicating a measured value to the ADC 242. The ADC 242 converts the analog signal from the temperature sensor 241 into a measurement code TEMP that is a digital signal, and supplies the measurement code TEMP to the code converter 251.

The conversion table 252 stores the measurement code TEMP, a positive-side control code pVctl, and a negative-side control code nVctl in association with each other. Here, the positive-side control code pVctl is a digital signal indicating a higher voltage (in other words, a voltage of a positive temperature characteristic) as the temperature is higher. Furthermore, the negative-side control code nVctl is a digital signal indicating a lower voltage (in other words, a voltage of a negative temperature characteristic) as the temperature is higher. The conversion table 252 is held in, for example, a read only memory (ROM).

The code converter 251 refers to the conversion table 252 and converts the measurement code TEMP from the temperature measurement circuit 240 into the corresponding positive-side control code pVctl and negative-side control code nVctl. The code converter 251 supplies the positive-side control code pVctl to the DAC 253 and supplies the negative-side control code nVctl to the DAC 254.

The DAC 253 converts the positive-side control code pVctl into a voltage and supplies the voltage to the transmission circuit 300 as a positive-side voltage Vdp. The DAC 254 converts the negative-side control code nVctl into a voltage and supplies the voltage to the transmission circuit 300 as a negative-side voltage Vdn.

Configuration Example of Transmission Circuit

Figure 4:
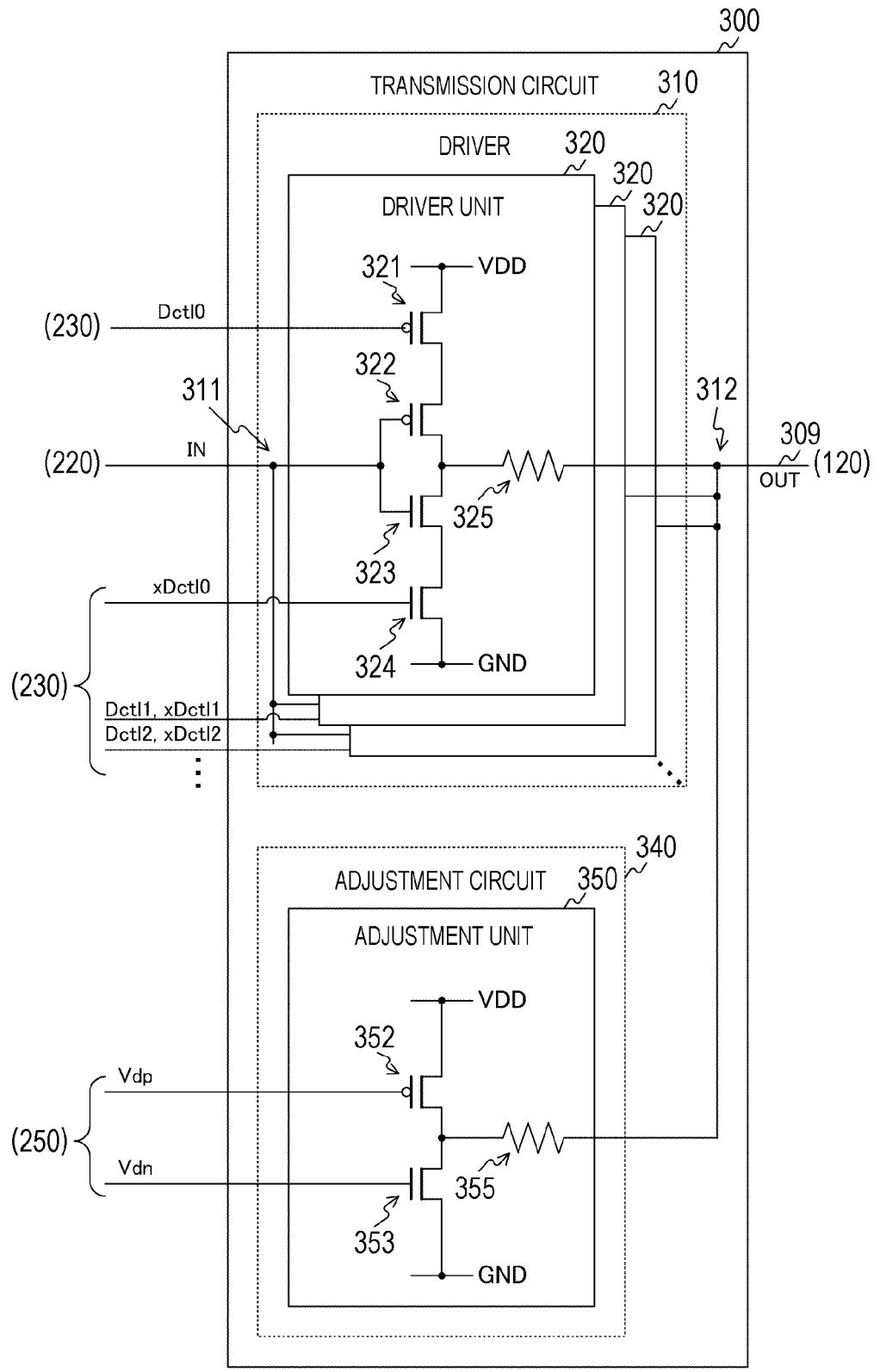
FIG. 4 is a circuit diagram illustrating a configuration example of a transmission circuit in the first embodiment of the present technology.

FIG. 4 is a circuit diagram illustrating a configuration example of the transmission circuit 300 in the first embodiment of the present technology. The transmission circuit 300 includes a driver 310 and an adjustment circuit 340. The driver 310 outputs an output signal OUT from an output node 312 on the basis of an input signal IN from the signal processing circuit 220. The driver 310 includes a plurality of driver units 320. The number of the driver units 320 in the driver 310 is N (N is an integer). Furthermore, the input signal IN and the output signal OUT are single-ended signals.

The plurality of driver units 320 is connected in parallel between the output node 312 and an input node 311 to which the input signal IN is input. Each of the driver units 320 includes p-channel metal oxide semiconductor (pMOS) transistors 321 and 322 and n-channel MOS (nMOS) transistors 323 and 324. Furthermore, each of the driver units 320 further includes a driver-side termination resistor 325.

The pMOS transistor 321 is inserted between a power supply node of a power supply voltage VDD and a source of the pMOS transistor 322. The nMOS transistor 324 is inserted between a ground node of a ground voltage GND and a source of the nMOS transistor 323. Furthermore, between a drain of the pMOS transistor 321 and a drain of the nMOS transistor 324, the pMOS transistor 322 and the nMOS transistor 323 are connected in series with the pMOS transistor 322 on the power supply side.

Furthermore, a number-of-drive-units control signal Dctln is input to a gate of the nth (n is an integer from 0 to N−1) pMOS transistor 321. A number-of-drive-units control signal xDctln having a phase different from that of Dctln by 180 degrees is input to a gate of the nth nMOS transistor 324.

Furthermore, the gates of the pMOS transistor 322 and the nMOS transistor 323 are commonly connected to the input node 311, and the input signal IN is input thereto. One end of the driver-side termination resistor 325 is connected to the output node 312, and the other end thereof is connected to a connection node between the pMOS transistor 322 and the nMOS transistor 323.

Values of number-of-drive-units control signals of the respective driver units are set in advance before a start of operation of the transmission circuit 300 and are held in the register 230.

With the above-described circuit configuration, the driver 310 inverts the input signal IN and outputs the inverted input signal IN as the output signal OUT. Furthermore, the number of the driver units 320 to be driven can be changed by the number-of-drive-units control signals set in advance. The termination resistance of the transmission circuit 300 is statically adjusted before the start of the operation of the transmission circuit 300 by controlling the number of drive units.

Here, the termination resistance of the transmission circuit 300 indicates a combined value of a termination resistance Rd of the driver 310, obtained by combining the respective termination resistances of the driver units 320, and a termination resistance Rc of the adjustment circuit 340. The static adjustment is performed to adjust a variation of the termination resistance due to a manufacturing process. Furthermore, a value of the termination resistance Rc of the adjustment circuit 340 is set to a value necessary for the adjustment. For example, in a case where a variation of the termination resistance of the driver 310 due to the temperature is 10%, a resistance having a value of ¹⁄₁₀ or more of Rd is used as the termination resistance Rc.

Furthermore, the adjustment circuit 340 includes an adjustment unit 350. The adjustment unit 350 includes a pMOS transistor 352, an nMOS transistor 353, and an adjustment-side termination resistor 355.

The pMOS transistor 352 and the nMOS transistor 353 are connected in series between the power supply node and the ground node with the pMOS transistor 352 on the power supply side. Note that the pMOS transistor 352 is an example of a positive-side adjustment transistor described in the claims, and the nMOS transistor 353 is an example of a negative-side adjustment transistor described in the claims.

A combined value of an on-resistance of the pMOS transistor 352, an on-resistance of the nMOS transistor 353, and the adjustment-side termination resistor 355 corresponds to the termination resistance Rc of the adjustment circuit 340 described above.

Furthermore, the positive-side voltage Vdp having a positive temperature characteristic is input from the control circuit 250 to a gate of the pMOS transistor 352. The negative-side voltage Vdn having a negative temperature characteristic is input from the control circuit 250 to a gate of the nMOS transistor 353. One end of the adjustment-side termination resistor 355 is connected to the output node 312, and the other end thereof is connected to a connection node between the pMOS transistor 352 and the nMOS transistor 353.

The positive-side voltage Vdp and the negative-side voltage Vdn are set to values equal to or higher than threshold voltages of the pMOS transistor 352 and the nMOS transistor 353, respectively. Such control of these gate voltages (Vdp and Vdn) enables the on-resistances of the pMOS transistor 352 and the nMOS transistor 353 to be changed and enables the termination resistance of the transmission circuit 300 to be adjusted according to the temperature. Such adjustment according to the temperature is executed by the control circuit 250 during the operation of the transmission circuit 300.

Even in a case where the termination resistance of the transmission circuit 300 has a positive temperature characteristic, it is possible to suppress a fluctuation of the termination resistance due to the temperature using the positive-side voltage Vdp having the positive temperature characteristic. Furthermore, even in a case where the termination resistance of the transmission circuit 300 has a negative temperature characteristic, it is possible to suppress the fluctuation of the termination resistance due to the temperature using the negative-side voltage Vdn having the negative temperature characteristic.

The static adjustment of the termination resistance by the control of the number of drive units and dynamic adjustment of the termination resistance by the control of the gate voltage according to the temperature can suppress the fluctuation of the termination resistance due to the process or the temperature and improve the quality of the output signal OUT.

Note that one driver 310 is arranged in the transmission circuit 300, but two or more drivers 310 can also be arranged. In this case, the adjustment circuit 340 is provided for each of the drivers 310.

Figure 5A:
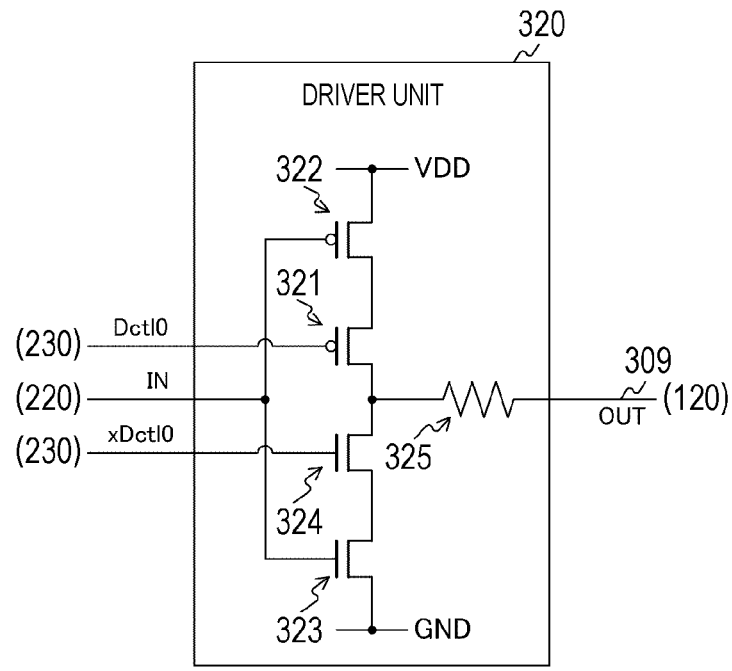
FIGS. 5A and 5B are circuit diagrams illustrating another example of a driver unit in the first embodiment of the present technology.

Furthermore, a circuit configuration of the driver unit 320 is not limited to that illustrated in the same drawing. For example, as illustrated in FIG. 5A, the pMOS transistor 321 and the nMOS transistor 324, which are configured to control the number of drive units, can also be inserted between the pMOS transistor 322 and the nMOS transistor 323. In this case, the driver-side termination resistor 325 is connected to a connection node between the pMOS transistor 321 and the nMOS transistor 324.

Figure 5B:
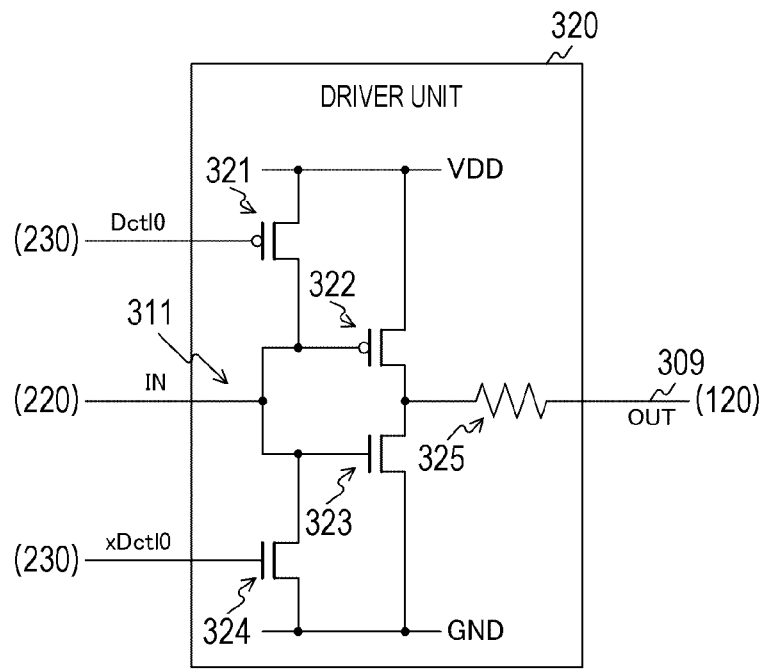

Furthermore, as illustrated in FIG. 5B, the pMOS transistor 321 and the nMOS transistor 324, which are configured to control the number of drive units, can also be inserted among the input node 311, the power supply node, and the ground node. In this case, the pMOS transistor 321 is inserted between the input node 311 and the power supply node, and the nMOS transistor 324 is inserted between the input node 311 and the ground node.

Figure 6A:
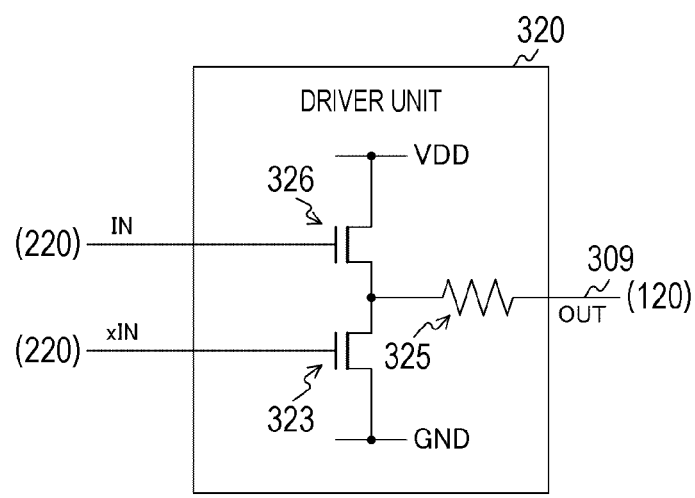
FIGS. 6A and 6B are circuit diagrams illustrating a configuration example of the driver unit using an N-type transistor in the first embodiment of the present technology.

Furthermore, as illustrated in FIG. 6A, it is also possible to arrange an nMOS transistor 326 and the nMOS transistor 323, instead of the pMOS transistor 322 and the nMOS transistor 323, and perform push-pull driving. In this case, the input signal IN is input to the nMOS transistor 326, and an input signal xIN having a phase different from that of IN by 180 degrees is input to the nMOS transistor 323.

Figure 6B:
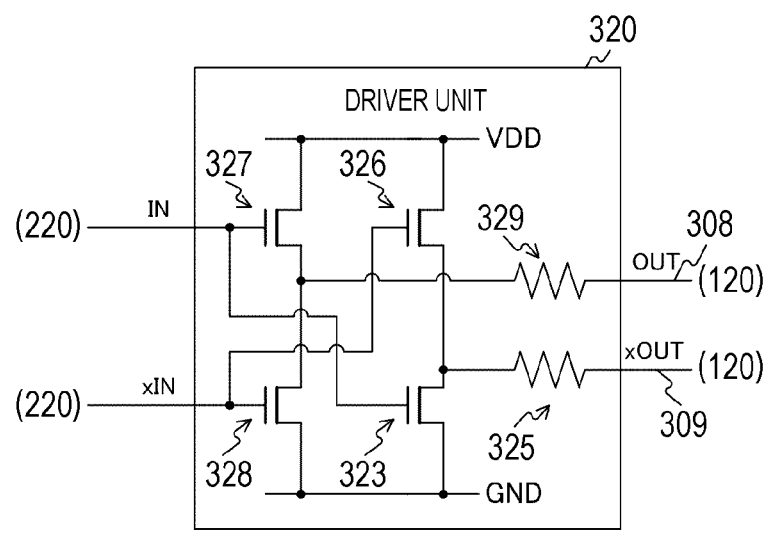

Furthermore, as illustrated in FIG. 6B of the same drawing, nMOS transistors 327 and 328 and a driver-side termination resistor 329 can be further added to the driver unit 320 in FIG. 6A of the same drawing. In this case, the nMOS transistors 327 and 328 are connected in series between the power supply node and the ground node with the nMOS transistor 327 on the power supply side. The input signal IN is input to the nMOS transistors 327 and 323, and the input signal xIN is input to the nMOS transistors 328 and 326. Furthermore, a connection node between the nMOS transistors 327 and 328 is connected to the driver-side termination resistor 329. Then, the output signal OUT and an output signal xOUT, which have phases different from each other by 180 degrees, are output from the driver unit 320.

Figure 7A:
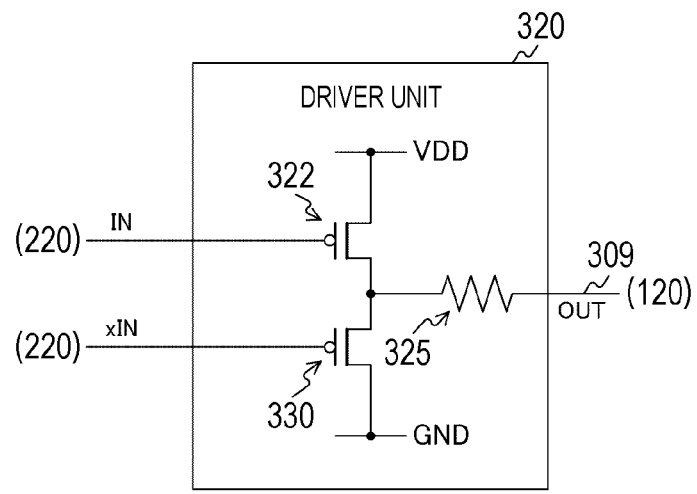
FIGS. 7A and 7B are circuit diagrams illustrating a configuration example of the driver unit using a P-type transistor in the first embodiment of the present technology.
Figure 7B:
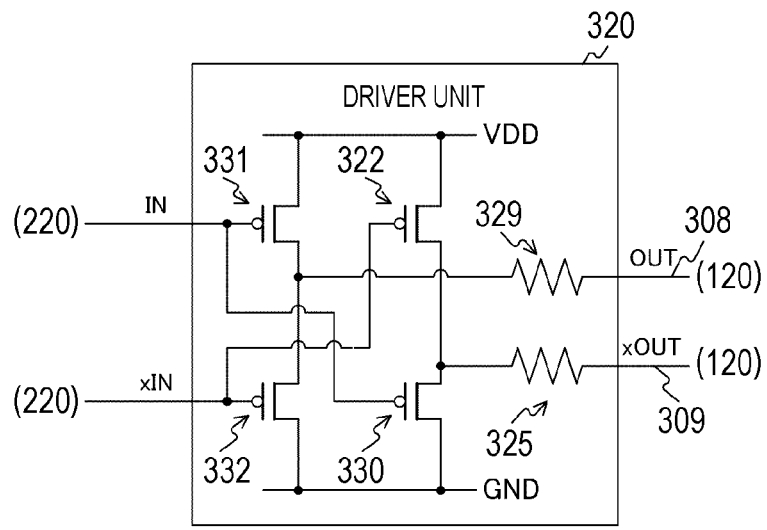

Furthermore, as illustrated in FIGS. 7A and 7B, the nMOS transistors in FIGS. 6A and 6B can be replaced with pMOS transistors.

Note that a transistor configured to control the number of drive units is omitted in FIGS. 6A, 6B, 7A, and 7B.

FIG. 8 is a view illustrating a configuration example of the conversion table 252 in the first embodiment of the present technology. The conversion table 252 holds the measurement code TEMP, and the positive-side control code pVctl and the negative-side control code nVctl corresponding to a code. For example, the measurement code TEMP of a value of T0 is held in association with the positive-side control code pVctl and the negative-side control code nVctl of values of Vdp0 and Vdn0. The positive-side control code pVctl indicating a higher voltage is set as the temperature is higher, and the negative-side control code nVctl indicating a lower voltage is set as the temperature is higher.

Figure 9A:
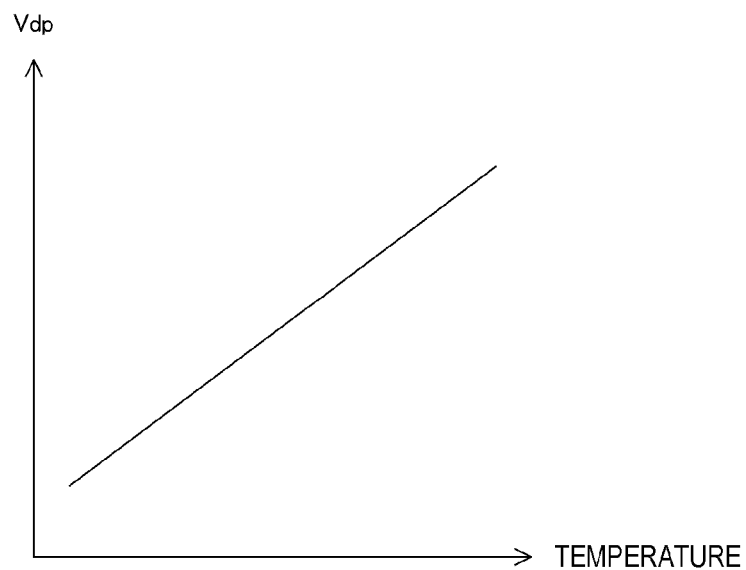
FIGS. 9A and 9B are graphs illustrating an example of a relationship between a temperature and a gate voltage in the first embodiment of the present technology.
Figure 9B:
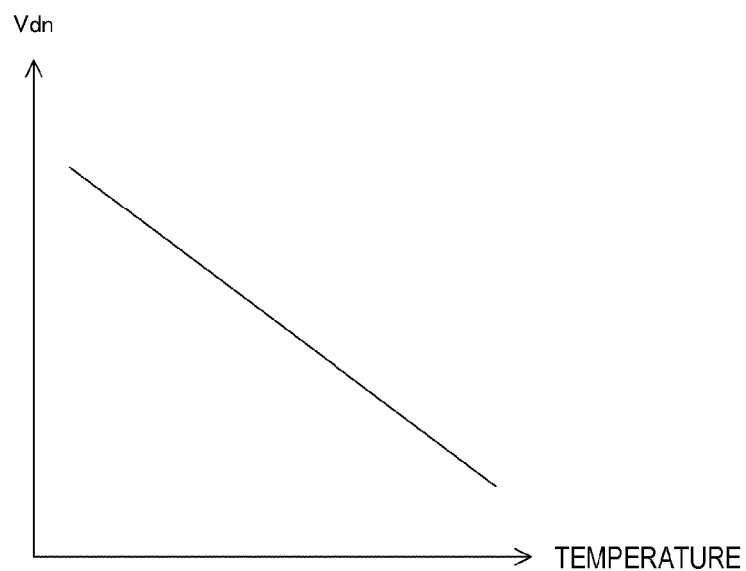

FIGS. 9A and 9B are graphs illustrating an example of a relationship between the temperature and the gate voltage in the first embodiment of the present technology. In the same drawing, the vertical axis represents the gate voltage (Vdp or Vdn), and the horizontal axis represents the temperature. In the same drawing, FIG. 9A illustrates an example of a relationship between the positive-side voltage Vdp and the temperature, and FIG. 9B of the same drawing illustrates an example of a relationship between the negative-side voltage Vdn and the temperature.

As illustrated in FIG. 9A of the same drawing, a higher voltage is set as the positive-side voltage Vdp as the temperature is higher. Furthermore, as illustrated in FIG. 9B of the same drawing, a lower voltage is set as the negative-side voltage Vdn as the temperature is higher. These gate voltages are set to appropriate values such that the fluctuation of the termination resistance of the transmission circuit 300 due to the temperature can be offset.

Figure 10:
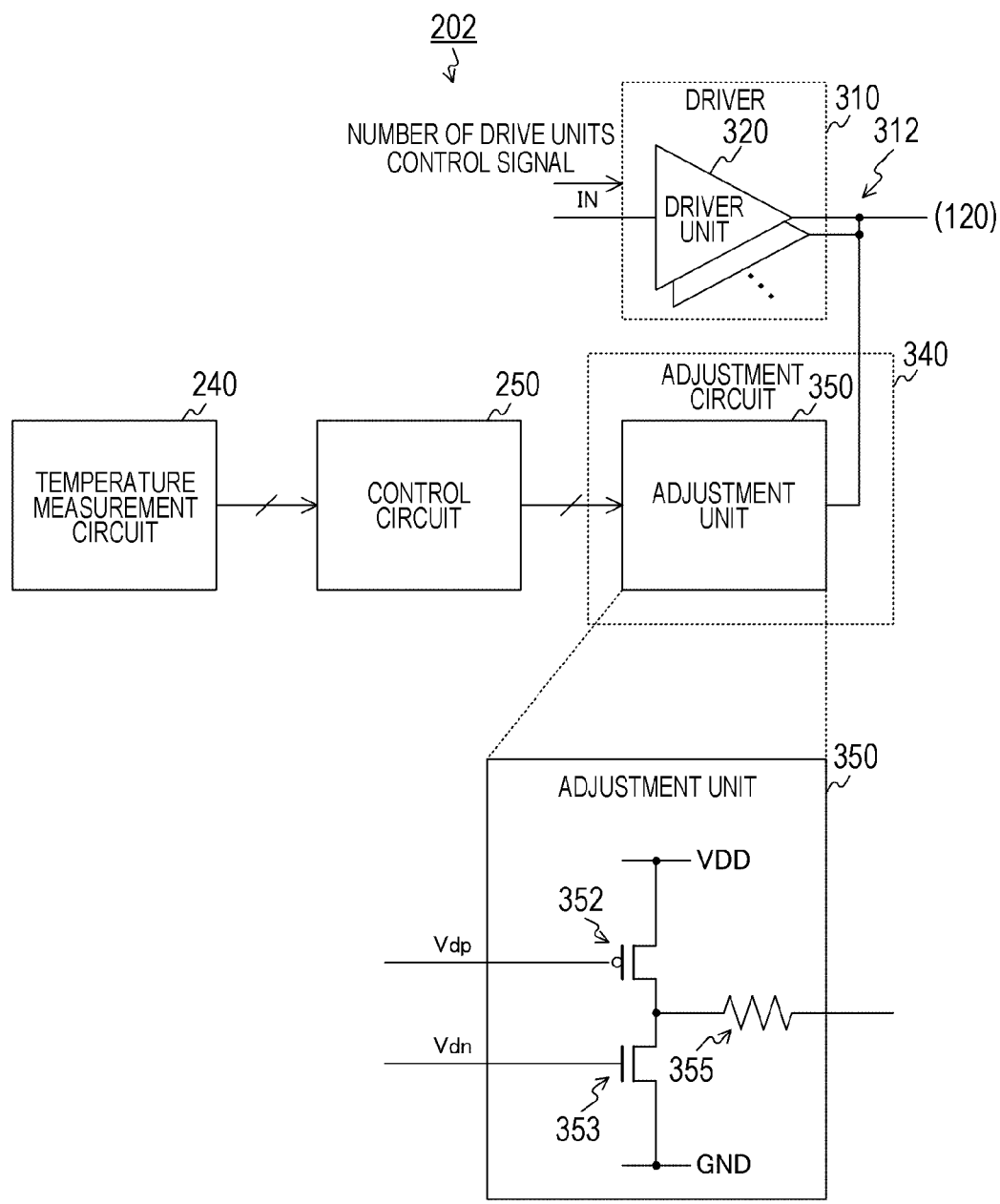
FIG. 10 is a block diagram illustrating a configuration example of a circuit chip in the first embodiment of the present technology.

FIG. 10 is a diagram illustrating the overall configuration of the circuit chip 202 according to the first embodiment of the present technology.

The driver 310 outputs the output signal OUT on the basis of the input signal IN. Furthermore, among the plurality of driver units 320 in the driver 310, a predetermined number of driver units are driven according to the number-of-drive-units control signal.

The adjustment unit 350 in the adjustment circuit 340 is provided with the adjustment-side termination resistor 355 having one end connected to the output node 312 of the driver 310, and the pMOS transistor 352 and the nMOS transistor 353 which are connected to the other end of the resistance.

The temperature measurement circuit 240 measures the temperature of the solid-state imaging element 200 and supplies the measurement code indicating the measured value to the control circuit 250. The control circuit 250 controls the gate voltages of the pMOS transistor 352 and the nMOS transistor 353 to values corresponding to the measured temperature. The positive-side voltage Vdp, which is higher as the temperature is higher, is applied to the gate of the pMOS transistor 352, and the negative-side voltage Vdn, which is lower as the temperature is higher, is applied to the gate of the nMOS transistor 353.

Operation Example of Imaging Device

Figure 11:
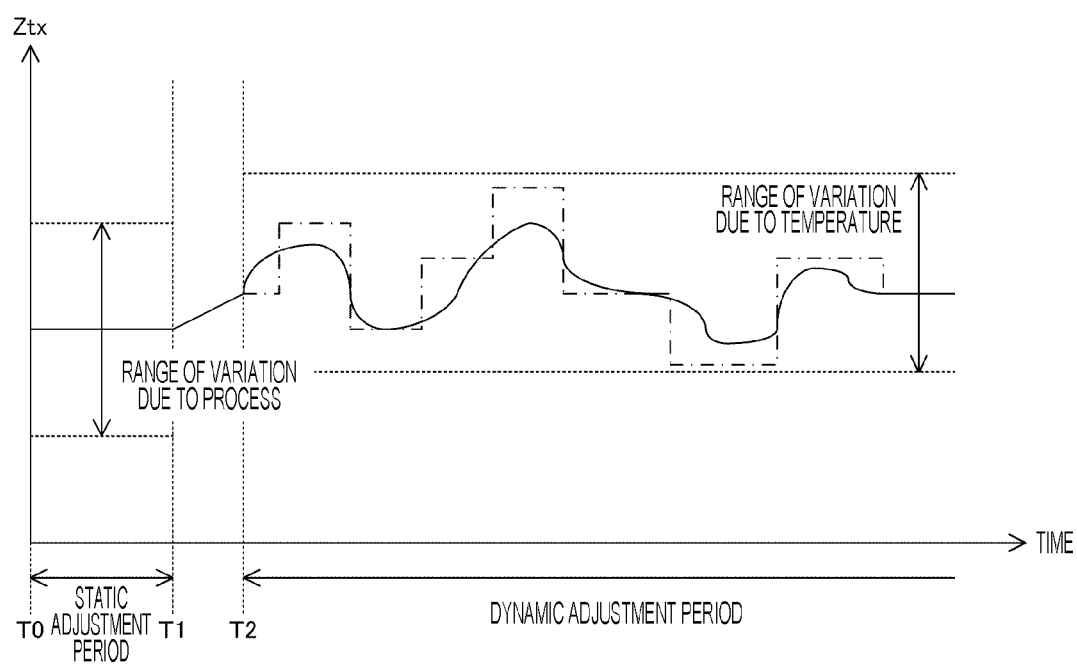
FIG. 11 is a view illustrating an example of a fluctuation of a termination resistance of the transmission circuit in the first embodiment of the present technology.

FIG. 11 is a view illustrating an example of a fluctuation of a termination resistance Ztx of the transmission circuit 300 in the first embodiment of the present technology. Before the start of the operation of the transmission circuit 300, the number of drive units is changed by the number-of-drive-units control signal within a static adjustment period from a timing T0 to a timing T1. Therefore, the termination resistance Ztx is adjusted in a stepwise (in other words, discrete) manner.

Although the termination resistance Ztx varies in a predetermined range due to the process, such a fluctuation is suppressed by the discrete adjustment.

Then, the termination resistance Ztx is continuously adjusted by the gate voltages according to the temperature within a dynamic adjustment period after the timing T1 when the operation of the transmission circuit 300 is started. Although the termination resistance Ztx varies in a predetermined range due to the temperature, such a fluctuation is suppressed by the continuous adjustment.

Here, a configuration in which a fluctuation of a termination resistance Ztx due to a temperature is adjusted by controlling the number of drive units in a dynamic adjustment period is assumed as a comparative example. A dashed-dotted line in the same drawing indicates the fluctuation of the termination resistance Ztx in the comparative example. As illustrated in the same drawing, the termination resistance Ztx can be adjusted only in a stepwise (discrete) manner in the comparative example. For this reason, it is difficult to adjust a variation of the termination resistance due to a temperature change in a case where the temperature fluctuates suddenly or in a case where the amount of the fluctuation is great. In particular, in a case where the imaging device 100 is a mobile device, a large temperature change is likely to occur, which causes a problem.

On the other hand, the termination resistance Ztx can be continuously adjusted according to the first embodiment in which the gate voltage according to the temperature is applied, and thus, the variation of the termination resistance due to the temperature change can be easily adjusted. Therefore, the signal quality of the output signal OUT can be improved. Furthermore, non-discrete control is performed, and thus, deterioration of waveform quality due to the control does not occur. Furthermore, it is possible to suppress the variation of the termination resistance Ztx while maintaining the waveform quality, and thus, it is possible to enhance the affinity with the application processor 110 in the subsequent stage.

Note that it is necessary to add the adjustment circuit 340, but an output capacitance can be reduced by reducing transistor sizes of the driver 310 and its preceding circuit can be reduced by the amount of suppression of the fluctuation of the termination resistance Ztx. The reduction in the transistor sizes of the driver 310 and its preceding circuit makes it possible to support an increase in speed, and it is possible to reduce power consumption and a chip size.

Figure 12:
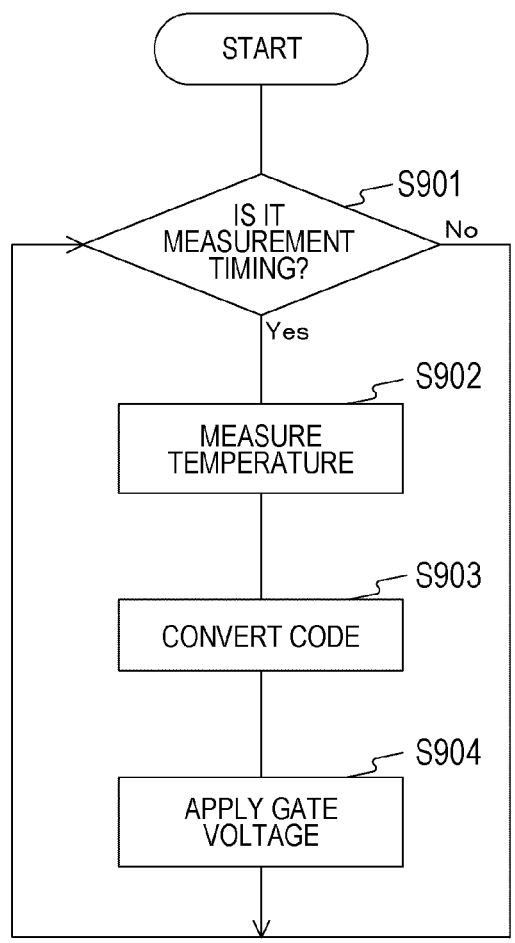
FIG. 12 is a flowchart illustrating an example of operation of the imaging device in the first embodiment of the present technology.

FIG. 12 is a flowchart illustrating an example of the operation of the imaging device 100 in the first embodiment of the present technology. This operation is initiated, for example, after the static adjustment is ended.

The temperature measurement circuit 240 determines whether or not current time is a measurement timing for measuring the temperature (step S901). In a case where it is the measurement timing (step S901: Yes), the temperature measurement circuit 240 measures the temperature (step S902). Then, the control circuit 250 converts a measurement code indicating the temperature into a control code (step S903), converts the control code into a gate voltage, and applies the voltage (step S904). This gate voltage adjusts a variation of the termination resistance due to the temperature.

In a case where it is not the measurement timing (step S901: Yes), or after step S904, the imaging device 100 repeats step S901 and the subsequent steps.

In this manner, the gate voltages of the pMOS transistor 352 and the nMOS transistor 353 are controlled to values corresponding to the temperature according to the first embodiment of the present technology, and thus, the termination resistance Ztx can be continuously adjusted. Therefore, it is possible to easily adjust the variation of the termination resistance due to the temperature change.

2. Second Embodiment

In the first embodiment described above, the adjustment circuit 340 adjusts the termination resistance by one adjustment unit 350. In this configuration, however, a required control range of a gate voltage is widened as an assumed temperature change is larger. The imaging device 100 of a second embodiment is different from that of the first embodiment in that the required control range of the gate voltage is narrowed by increasing the number of the adjustment units 350.

Figure 13:
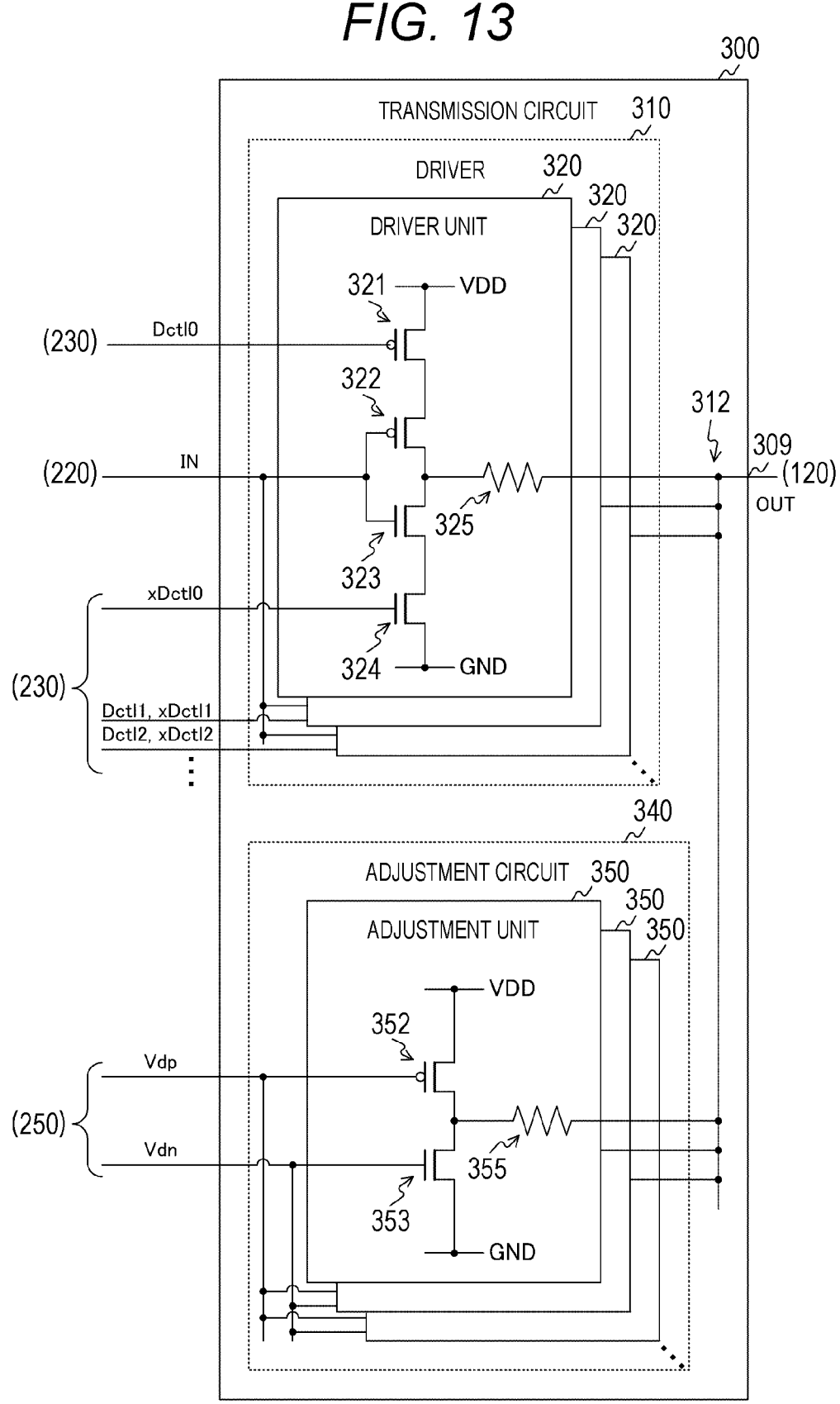
FIG. 13 is a circuit diagram illustrating a configuration example of a transmission circuit in a second embodiment of the present technology.

FIG. 13 is a circuit diagram illustrating a configuration example of the transmission circuit 300 in the second embodiment of the present technology. The transmission circuit 300 of the second embodiment is different from that of the first embodiment in that a plurality of the adjustment units 350 is arranged in the adjustment circuit 340. These adjustment units 350 are connected in parallel between the output node 312 and the control circuit 250.

Figure 14A:
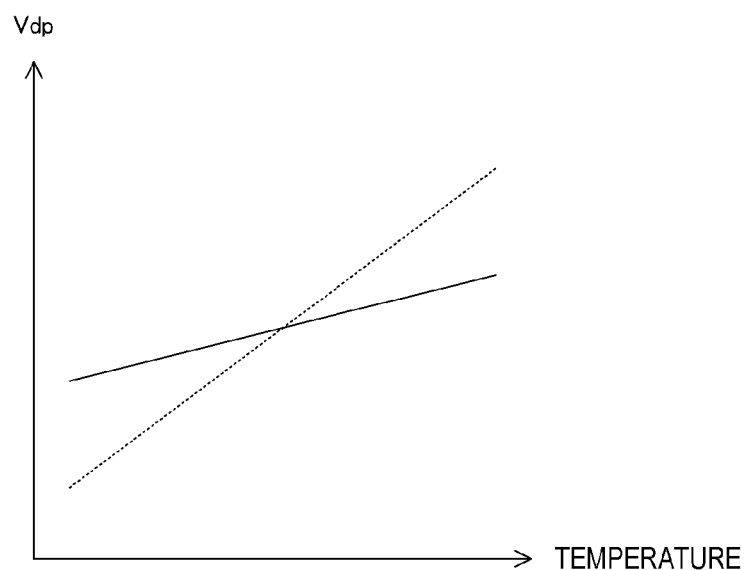
FIGS. 14A and 14B are graphs illustrating an example of a relationship between a temperature and a gate voltage in the second embodiment of the present technology.
Figure 14B:
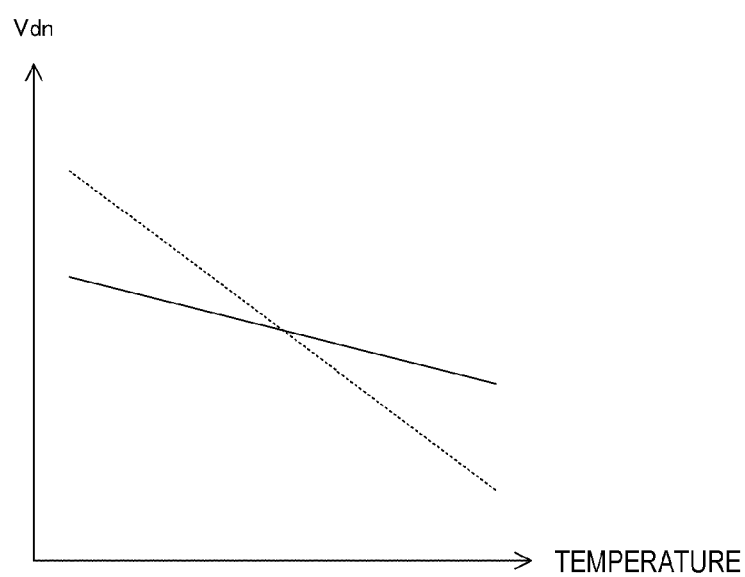

FIGS. 14A and 14B are graphs illustrating an example of a relationship between a temperature and a gate voltage in the second embodiment of the present technology. In the same drawing, the vertical axis represents the gate voltage, and the horizontal axis represents the temperature. In the same drawing, FIG. 14A illustrates an example of a relationship between the positive-side voltage Vdp and the temperature, and FIG. 14B of the same drawing illustrates an example of a relationship between the negative-side voltage Vdn and the temperature.

Furthermore, a solid line in the same drawing indicates the relationship between the temperature and the gate voltage in the second embodiment, and a dotted line indicates the relationship between the temperature and the gate voltage in the first embodiment. When the number of the adjustment units 350 in the adjustment circuit 340 is M (M is an integer) and a control range of the gate voltage is $\Delta V$, a correction range of a termination resistance by the gate voltage is a value proportional to $\Delta V \times M$. For this reason, as illustrated in the same drawing, a slope of a straight line decreases as the number of units is increased, so that the control range of the gate voltage can be narrowed.

In this manner, the plurality of adjustment units 350 is provided in the adjustment circuit 340 according to the second embodiment of the present technology, and thus, the control range of the gate voltage can be narrowed.

3. Third Embodiment

Although the plurality of adjustment units 350 is arranged and all the adjustment units are driven in the second embodiment described above, there may be a case where it is unnecessary to drive all the adjustment units 350. The imaging device 100 of a third embodiment is different from that of the second embodiment in that the number of the adjustment units 350 to be driven is controlled.

Figure 15:
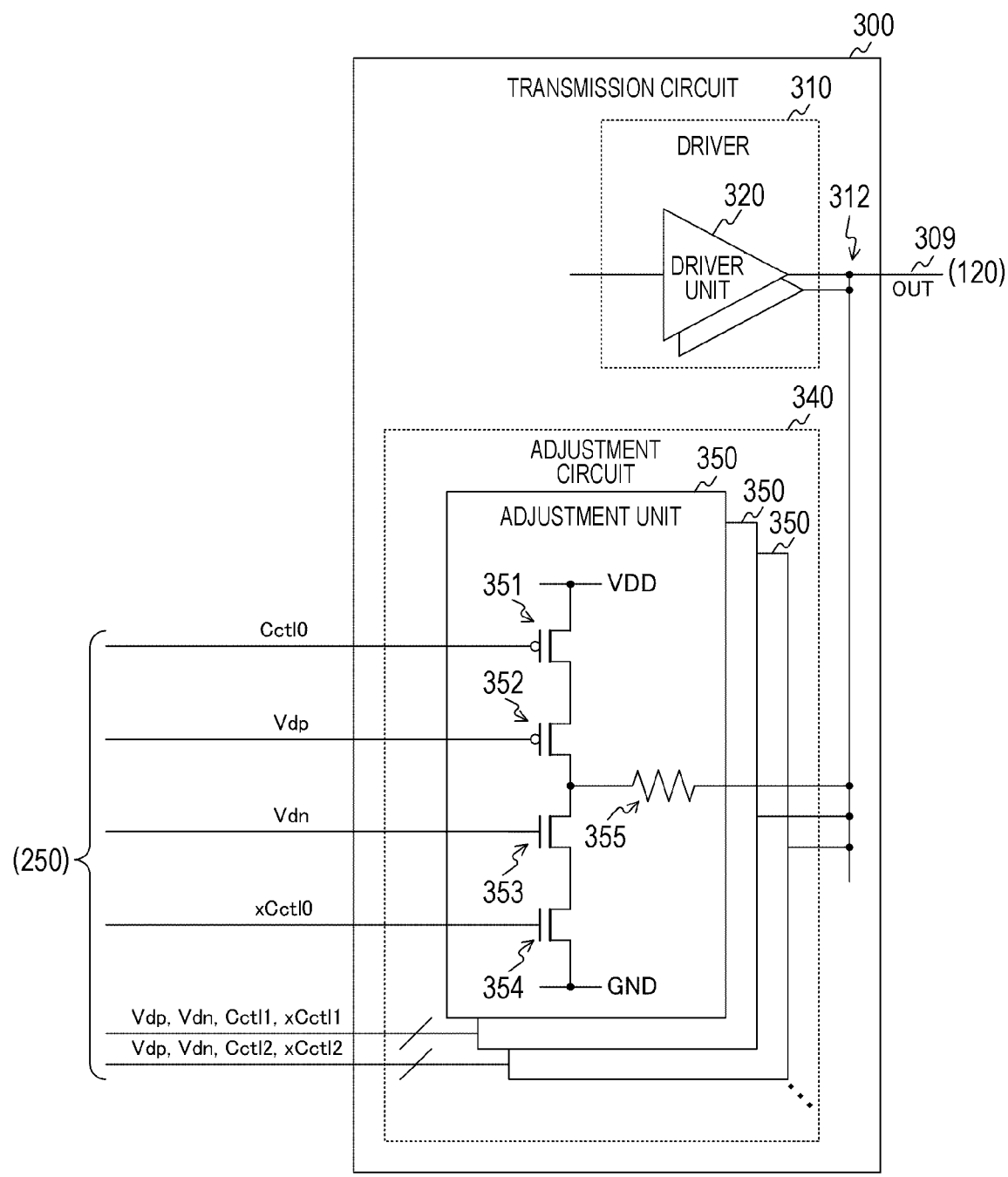
FIG. 15 is a circuit diagram illustrating a configuration example of a transmission circuit in a third embodiment of the present technology.

FIG. 15 is a circuit diagram illustrating a configuration example of the transmission circuit 300 in the third embodiment of the present technology. The transmission circuit 300 of the third embodiment is different from that of the second embodiment in that each of the adjustment units 350 further includes a pMOS transistor 351 and an nMOS transistor 354.

The pMOS transistor 351 is inserted between a power supply node and a source of the pMOS transistor 352. The nMOS transistor 354 is inserted between a ground node and a source of the nMOS transistor 353.

Furthermore, a number-adjustment-units control signal Cctlm is input to a gate of the mth (m is an integer from 0 to M−1) pMOS transistor 351. A number-adjustment-units control signal xCctlm having a phase different from that of Cctlm by 180 degrees is input to a gate of the mth nMOS transistor 354. The control circuit 250 further controls the number of the adjustment units 350 to be driven by the number-adjustment-units control signals Cctlm and xCctlm.

Note that a circuit configuration of the adjustment unit 350 is not limited to that illustrated in the same drawing. A circuit equivalent to the circuit illustrated in FIGS. 5A and 5B can also be used.

FIG. 16 is a view illustrating a configuration example of the conversion table 252 in the third embodiment of the present technology. In the conversion table 252 of the third embodiment, the number-adjustment-units control signals Cctlm and xCctlm of each of the plurality of adjustment units 350 are further held in association with a temperature. The number of the adjustment units 350 is set to one at a temperature within the narrowest temperature range ΔT0. The number of the adjustment units 350 is set to two at a temperature within a temperature range ΔT1 that does not correspond to the temperature within ΔT0 and is wider than ΔT0. Thereafter, more adjustment units 350 are driven as the temperature range is wider.

In this manner, the control circuit 250 also controls the number of the adjustment units 350 according to the third embodiment of the present technology, and thus, the capability of adjusting a termination resistance according to the temperature can be made variable.

4. Fourth Embodiment

Although the variation of the termination resistance due to the process or the temperature is adjusted in the first embodiment described above, there may be a case where an on-resistance of a transistor fluctuates due to a fluctuation of a power supply voltage so that the termination resistance varies. The imaging device 100 of a fourth embodiment is different from that of the first embodiment in that a regulator that suppresses a fluctuation of a power supply voltage is further provided.

Figure 17:
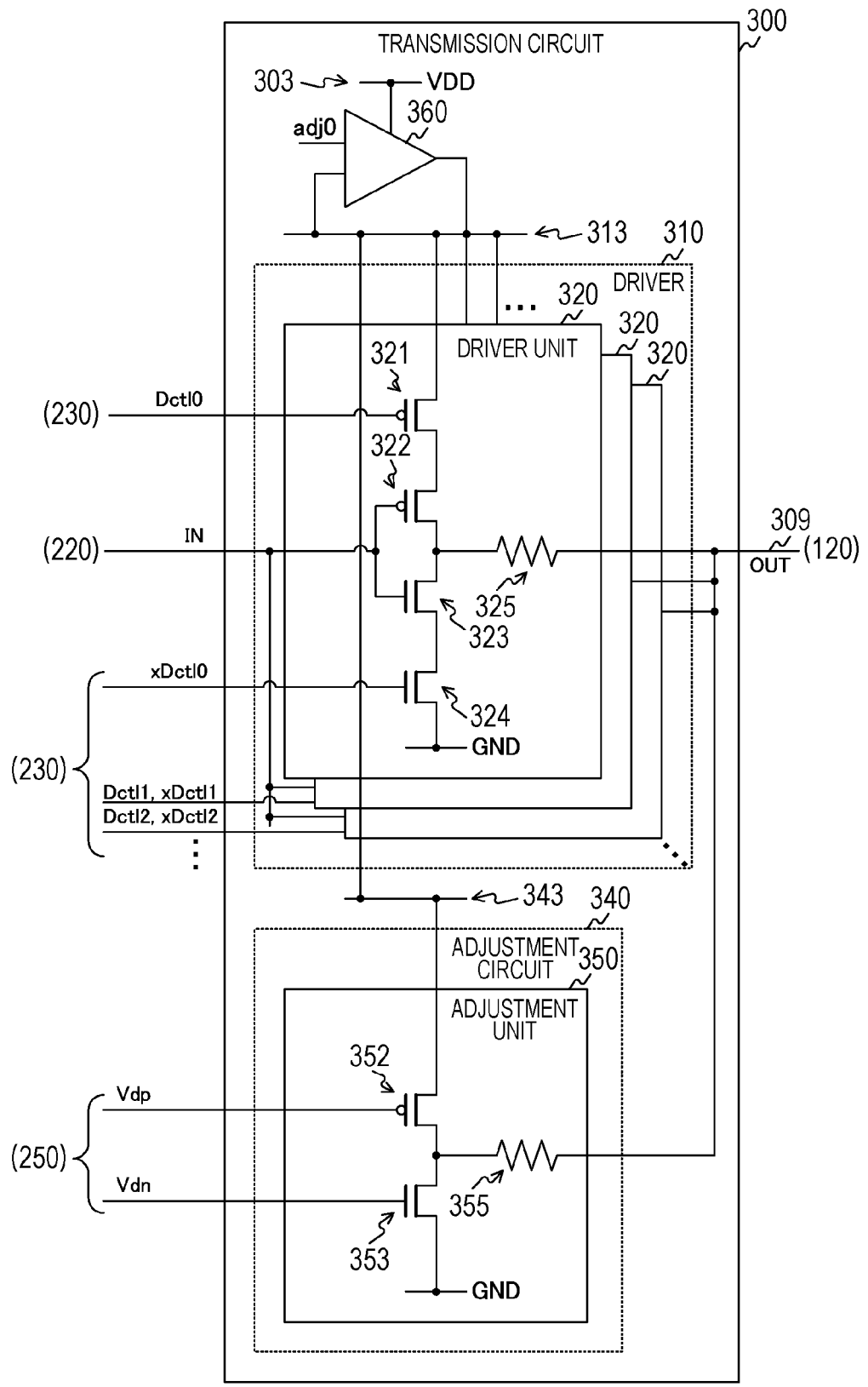
FIG. 17 is a circuit diagram illustrating a configuration example of a transmission circuit in a fourth embodiment of the present technology.

FIG. 17 is a circuit diagram illustrating a configuration example of the transmission circuit 300 in the fourth embodiment of the present technology. The transmission circuit 300 of the fourth embodiment is different from that of the first embodiment in that a power-supply-side regulator 360 is further provided.

An input terminal and an output terminal of the power-supply-side regulator 360 are commonly connected to a power supply node 313 of the driver 310 and a power supply node 343 of the adjustment circuit 340. Furthermore, a power supply terminal of the power-supply-side regulator 360 is connected to a power supply node 303 of the power supply voltage VDD.

The power-supply-side regulator 360 controls a power supply voltage of each of the driver 310 and the adjustment circuit 340 according to a control signal adj0 to suppress a fluctuation thereof.

Note that a gate voltage can be set in consideration of a fluctuation of a termination resistance caused by the fluctuation of the power supply voltage, but in this case, it is necessary to widen a control range of the gate voltage as compared with that in a case where the power-supply-side regulator 360 is provided. Here, if the number of the adjustment units 350 is increased, the widening of the control range of the gate voltage can be suppressed, but an output capacitance of the transmission circuit 300 increases accordingly.

As a variation of the power supply voltage is canceled by the power-supply-side regulator 360, the control range of the gate voltage can be narrowed. In addition, the output capacitance can be reduced since design with a smaller number of the adjustment units 350 is possible.

Note that the second and third embodiments can be applied to the fourth embodiment.

In this manner, the power-supply-side regulator 360 suppresses the fluctuation of the power supply voltage according to the fourth embodiment of the present technology, and thus, it is possible to suppress the variation of the termination resistance due to the fluctuation of the power supply voltage.

5. Fifth Embodiment

Although the variation of the termination resistance due to the process or the temperature is adjusted in the first embodiment described above, there may be a case where the termination resistance varies due to a fluctuation of a ground voltage. The imaging device 100 of a fifth embodiment is different from that of the first embodiment in that a regulator that suppresses the fluctuation of the ground voltage is further provided.

Figure 18:
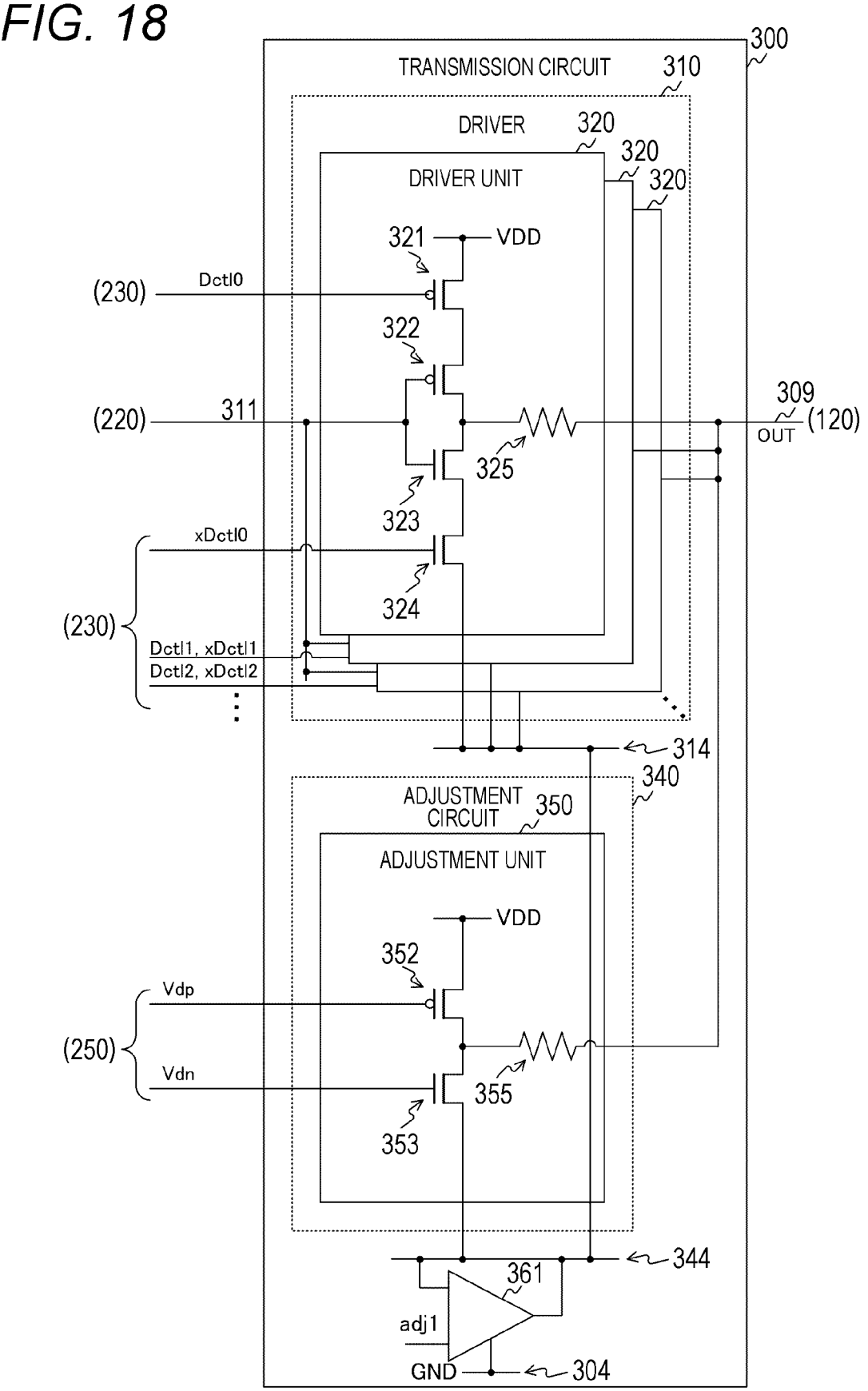
FIG. 18 is a circuit diagram illustrating a configuration example of a transmission circuit in a fifth embodiment of the present technology.

FIG. 18 is a circuit diagram illustrating a configuration example of the transmission circuit 300 in the fifth embodiment of the present technology. The transmission circuit 300 of the fifth embodiment is different from that of the first embodiment in that a ground-side regulator 361 is further provided.

An input terminal and an output terminal of the ground-side regulator 361 are commonly connected to a ground node 314 of the driver 310 and a ground node 344 of the adjustment circuit 340. Furthermore, a ground terminal of the ground-side regulator 361 is connected to a ground node 304 of the ground voltage GND.

The ground-side regulator 361 controls a ground voltage of each of the driver 310 and the adjustment circuit 340 according to a control signal adj1 to suppress a fluctuation thereof.

Note that the second and third embodiments can be applied to the fifth embodiment.

In this manner, the ground-side regulator 361 suppresses the fluctuation of the ground voltage according to the fifth embodiment of the present technology, and thus, it is possible to suppress a variation of a termination resistance due to the fluctuation of the ground voltage.

6. Sixth Embodiment

Although the variation of the termination resistance due to the process or the temperature is adjusted in the first embodiment described above, there may be a case where the termination resistance varies due to fluctuations of a power supply voltage and a ground voltage. The imaging device 100 of a sixth embodiment is different from that of the first embodiment in that regulators respectively suppressing the fluctuations of the power supply voltage and the ground voltage are further provided.

Figure 19:
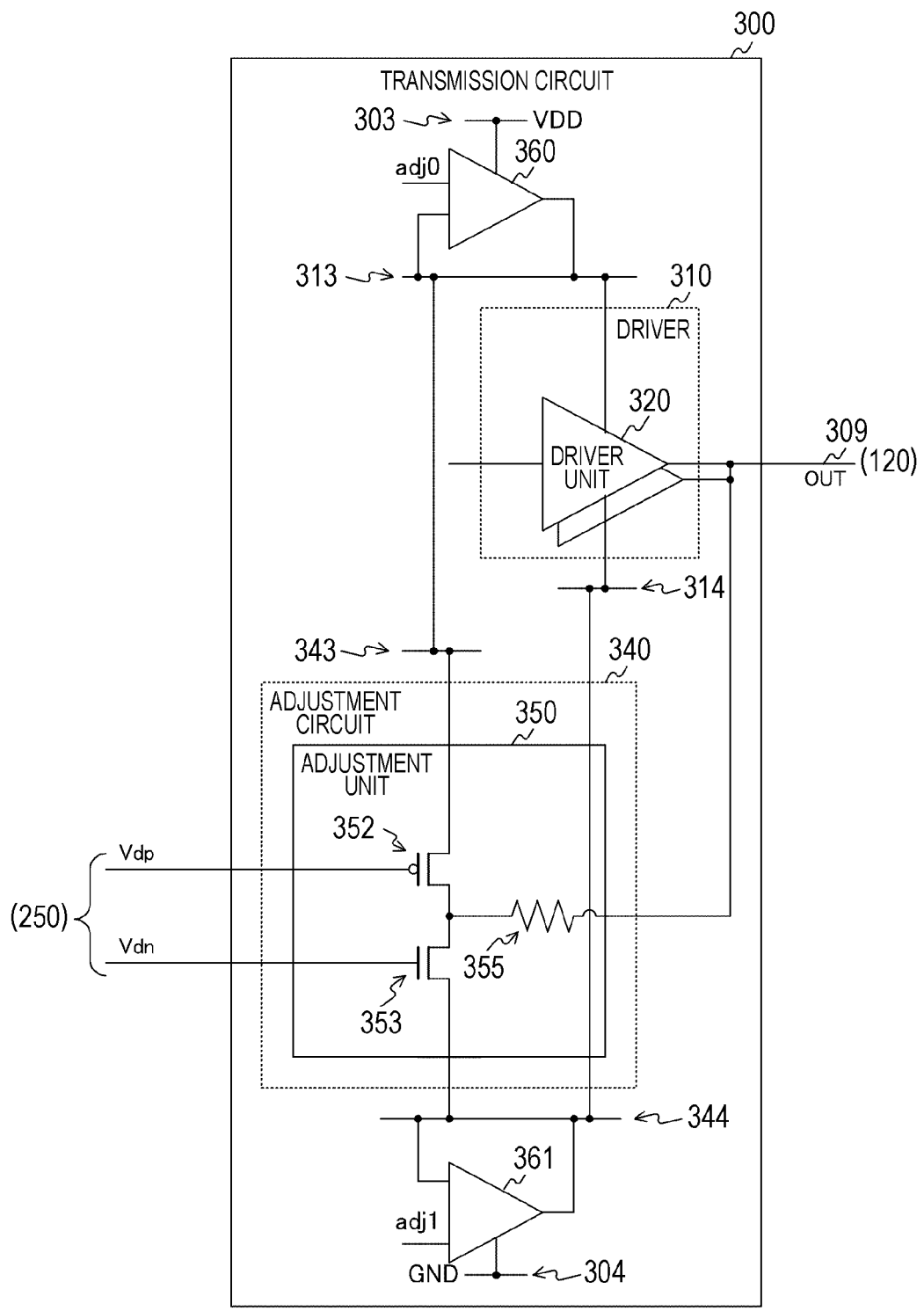
FIG. 19 is a circuit diagram illustrating a configuration example of a transmission circuit in a sixth embodiment of the present technology.

FIG. 19 is a circuit diagram illustrating a configuration example of the transmission circuit 300 in the sixth embodiment of the present technology. The transmission circuit 300 of the sixth embodiment is different from that of the first embodiment in that the power-supply-side regulator 360 and the ground-side regulator 361 are further provided. Connection configurations of these regulators are similar to those illustrated in FIGS. 17 and 18.

Note that the second and third embodiments can be applied to the sixth embodiment.

In this manner, the power-supply-side regulator 360 and the ground-side regulator 361 suppress the fluctuations of the power supply voltage and the ground voltage according to the sixth embodiment of the present technology, and thus, it is possible to suppress a variation of a termination resistance due to the fluctuations of the power supply voltage and the ground voltage.

7. Seventh Embodiment

In the first embodiment described above, the control circuit 250 adjusts the variation of the termination resistance by applying the gate voltages respectively having the positive and negative temperature characteristics. However, there may be a case where it is unnecessary to apply the gate voltage having the negative temperature characteristic. The imaging device 100 of a seventh embodiment is different from that of the first embodiment in that the nMOS transistor 353 is not arranged.

Figure 20:
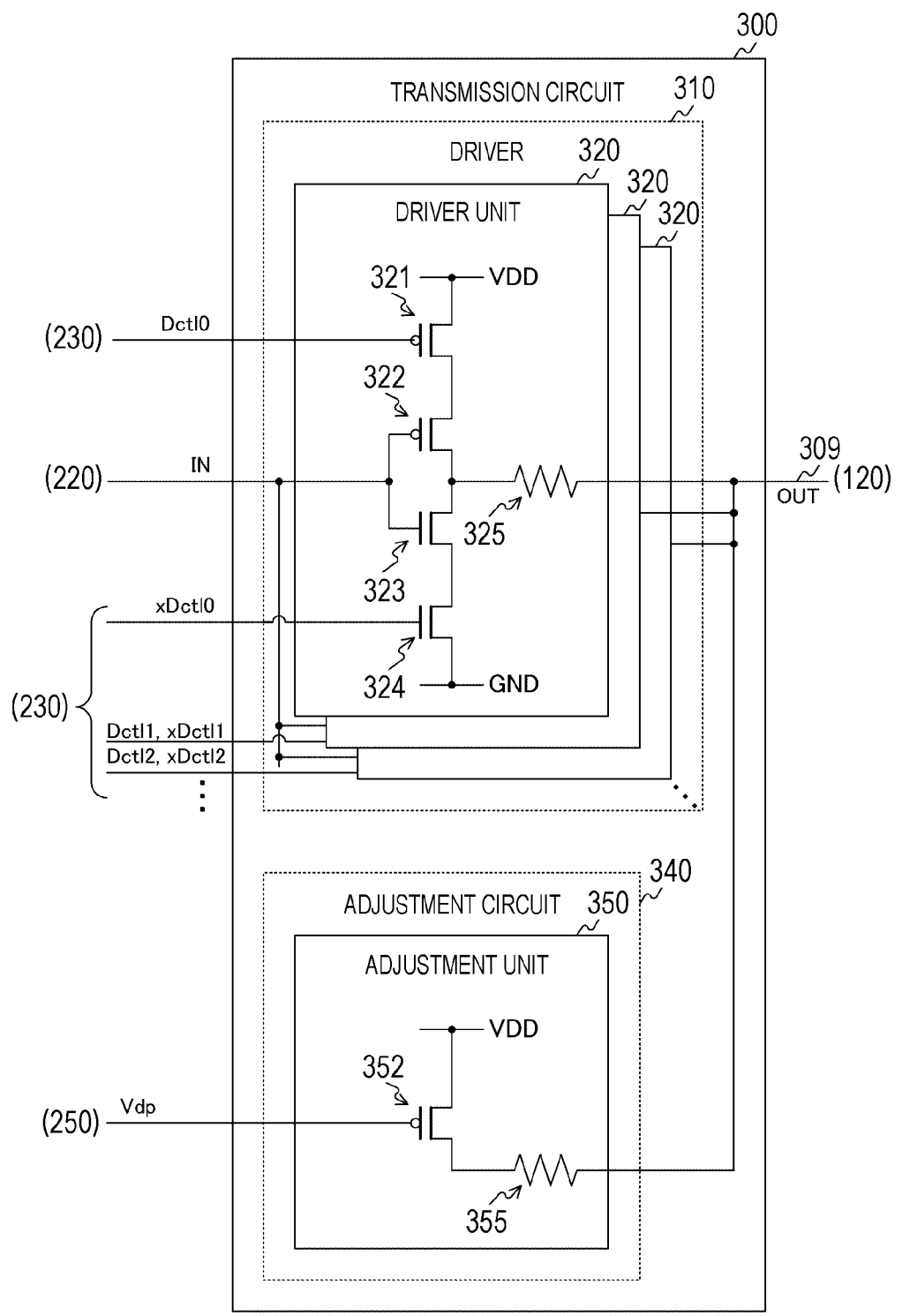
FIG. 20 is a circuit diagram illustrating a configuration example of a transmission circuit in a seventh embodiment of the present technology.

FIG. 20 is a circuit diagram illustrating a configuration example of the transmission circuit 300 in the seventh embodiment of the present technology. The transmission circuit 300 of the seventh embodiment is different from that of the first embodiment in that the nMOS transistor 353 is not arranged in the adjustment unit 350. In the seventh embodiment, it is assumed that a variation of a termination resistance can be sufficiently suppressed without applying the negative-side voltage Vdn. Although a circuit configuration of the adjustment unit 350 is preferably the same as that of the driver unit 320, the circuit configuration of the adjustment unit 350 can be appropriately changed according to a temperature characteristic of the termination resistance as illustrated in the same drawing.

Figure 21:
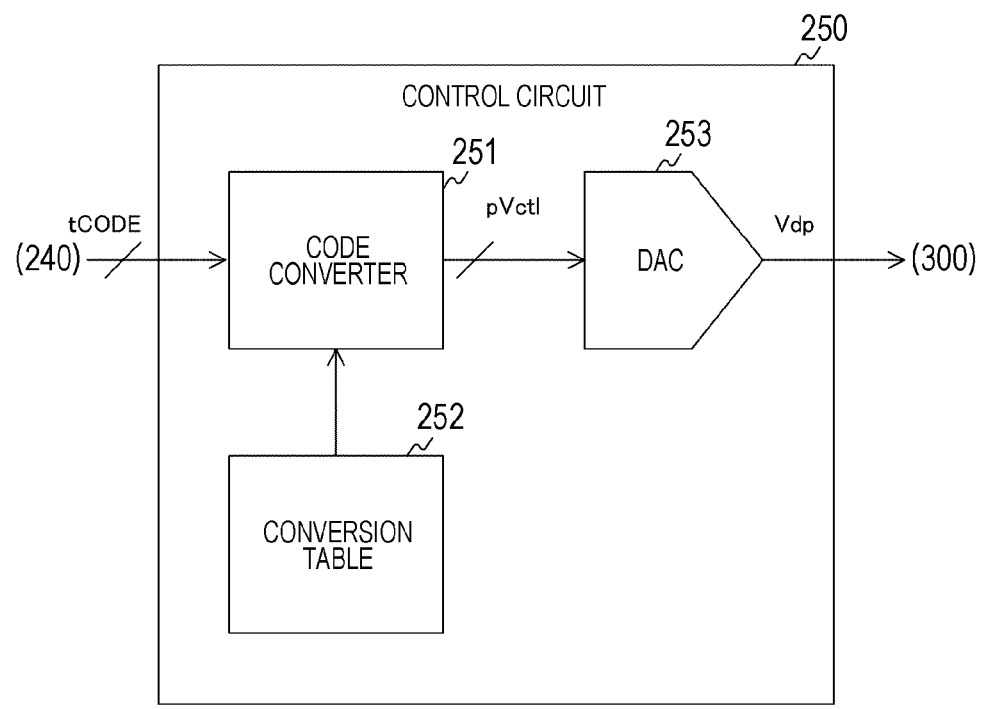
FIG. 21 is a block diagram illustrating a configuration example of a control circuit in the seventh embodiment of the present technology.

FIG. 21 is a block diagram illustrating a configuration example of the control circuit 250 in the seventh embodiment of the present technology. The control circuit 250 of the seventh embodiment is different from that of the first embodiment in that the DAC 254 is not arranged. Furthermore, a conversion table of the seventh embodiment is different from that of the first embodiment in that the negative-side control code nVctl is not held.

Note that any of the second to sixth embodiments can be applied to the seventh embodiment.

In this manner, the nMOS transistor 353 is not arranged according to the seventh embodiment of the present technology, and thus, a circuit scale can be reduced.

8. Eighth Embodiment

In the first embodiment described above, the control circuit 250 adjusts the variation of the termination resistance by applying the gate voltages respectively having the positive and negative temperature characteristics. However, there may be a case where it is unnecessary to apply the gate voltage having the positive temperature characteristic. The imaging device 100 of an eighth embodiment is different from that of the first embodiment in that the pMOS transistor 352 is not arranged.

Figure 22:
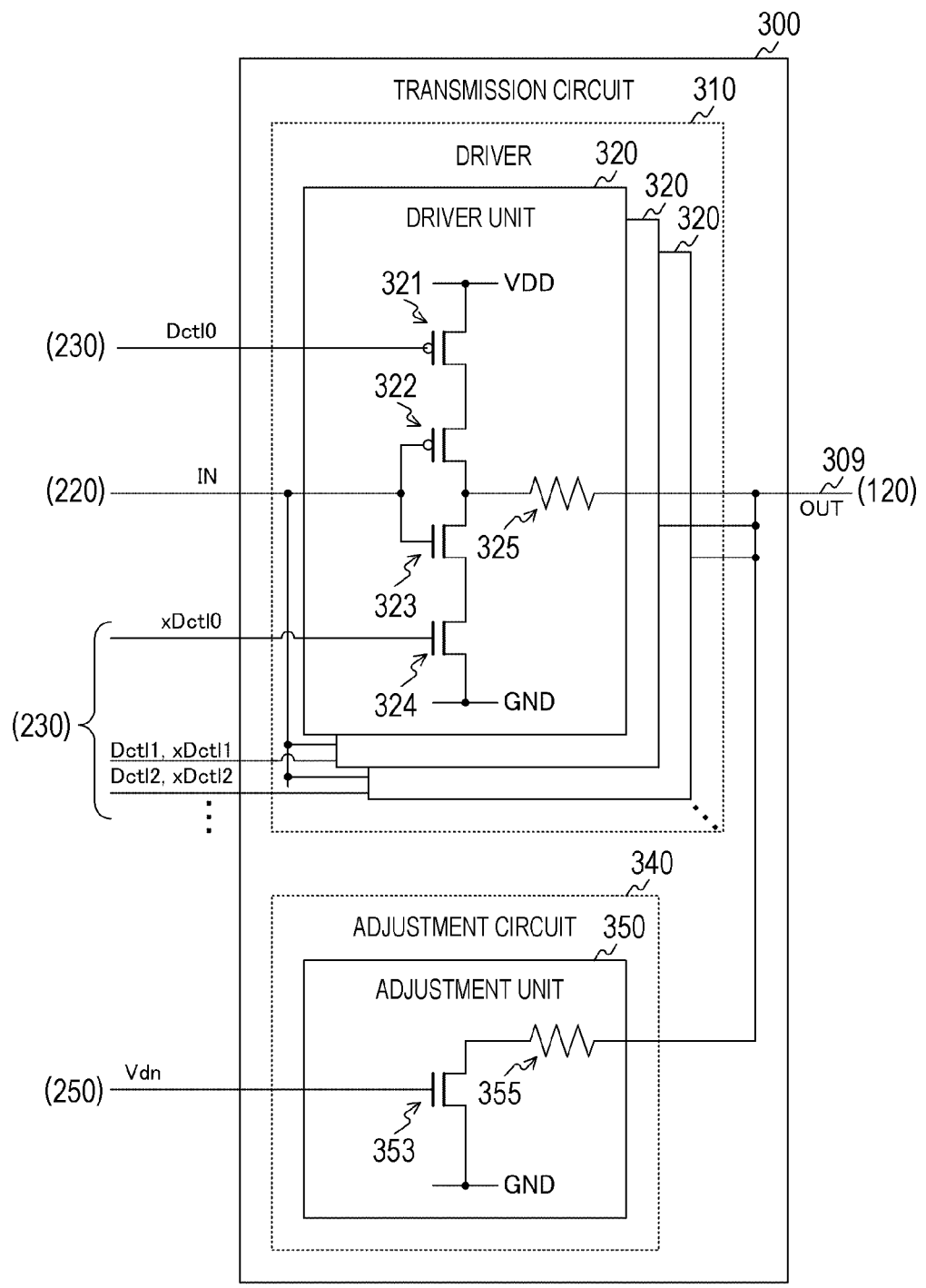
FIG. 22 is a circuit diagram illustrating a configuration example of a transmission circuit in an eighth embodiment of the present technology.

FIG. 22 is a circuit diagram illustrating a configuration example of the transmission circuit 300 in the eighth embodiment of the present technology. The transmission circuit 300 of the eighth embodiment is different from that of the first embodiment in that the pMOS transistor 352 is not arranged in the adjustment unit 350. In the eighth embodiment, it is assumed that a variation of a termination resistance can be sufficiently suppressed without applying the positive-side voltage Vdp.

Figure 23:
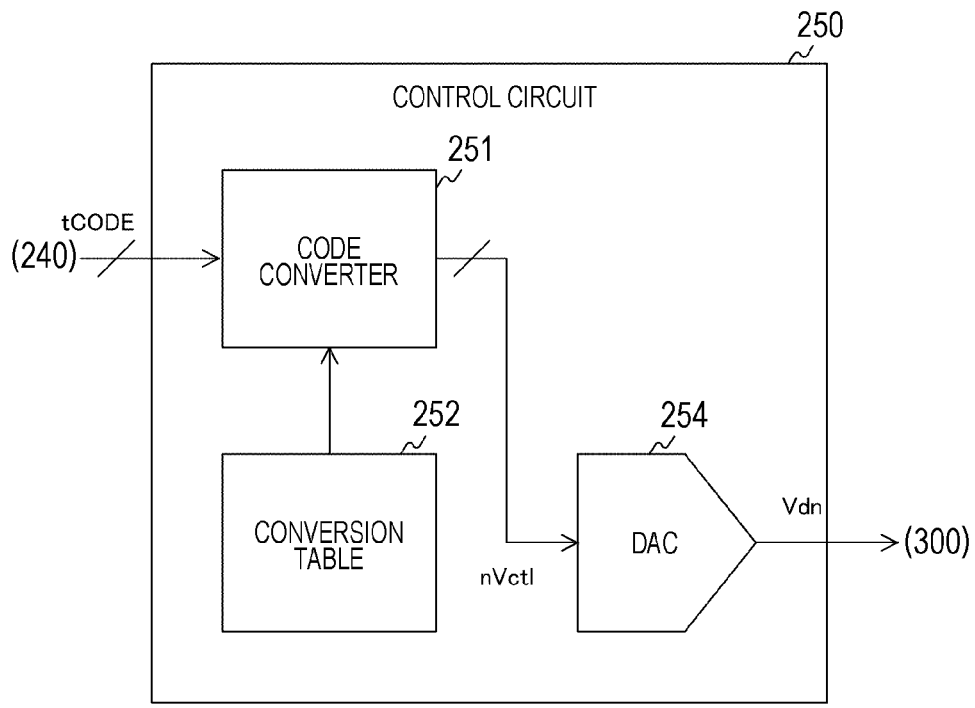
FIG. 23 is a block diagram illustrating a configuration example of a control circuit in the eighth embodiment of the present technology.

FIG. 23 is a block diagram illustrating a configuration example of the control circuit 250 in the eighth embodiment of the present technology. The control circuit 250 of the eighth embodiment is different from that of the first embodiment in that the DAC 253 is not arranged. Furthermore, a conversion table of the eighth embodiment is different from that of the first embodiment in that the positive-side control code pVctl is not held.

Note that any of the second to sixth embodiments can be applied to the eighth embodiment.

In this manner, the pMOS transistor 352 is not arranged according to the eighth embodiment of the present technology, and thus, a circuit scale can be reduced.

9. Ninth Embodiment

In the first embodiment described above, the driver 310 outputs the single-ended signal, but can also output a differential signal. The imaging device 100 of a ninth embodiment is different from that of the first embodiment in that the driver 310 outputs a differential signal.

Figure 24:
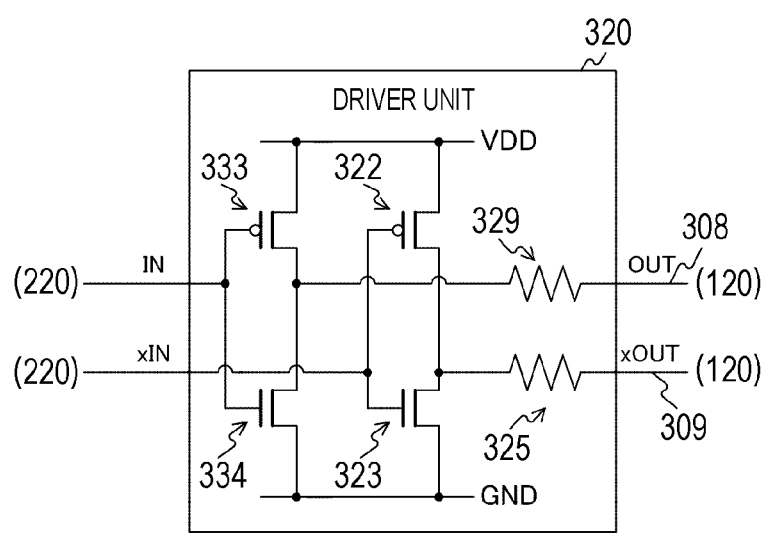
FIG. 24 is a circuit diagram illustrating a configuration example of a driver unit in a ninth embodiment of the present technology.

FIG. 24 is a circuit diagram illustrating a configuration example of the driver unit 320 in the ninth embodiment of the present technology. The driver unit 320 of the ninth embodiment is different from that of the first embodiment in that a pMOS transistor 333, an nMOS transistor 334, and the driver-side termination resistor 329 are further provided. Note that a transistor configured to control the number of drive units is omitted in the same drawing.

The pMOS transistor 333 and the nMOS transistor 334 are connected in series between a power supply node and a ground node. The input signal IN is input to gates of the pMOS transistor 333 and the nMOS transistor 334. The input signal xIN having a phase different from that of IN by 180 degrees is input to gates of the pMOS transistor 322 and the nMOS transistor 323.

A connection node between the pMOS transistor 333 and the nMOS transistor 334 is connected to one end of the driver-side termination resistor 329. The output signal OUT is output from the other end of the driver-side termination resistor 329 via a signal line 308. A connection node between the pMOS transistor 322 and the nMOS transistor 323 is connected to one end of the driver-side termination resistor 325. The output signal xOUT is output from the other end of the driver-side termination resistor 325 via the signal line 309.

With a circuit configuration illustrated in the same drawing, the driver 310 outputs the differential signal as the output signal on the basis of the input signal that is the differential signal. Since the differential signal is transmitted, waveform quality and resistance to noise can be improved as compared with the case of transmitting the single-ended signal. Furthermore, power consumption can be reduced.

Figure 25:
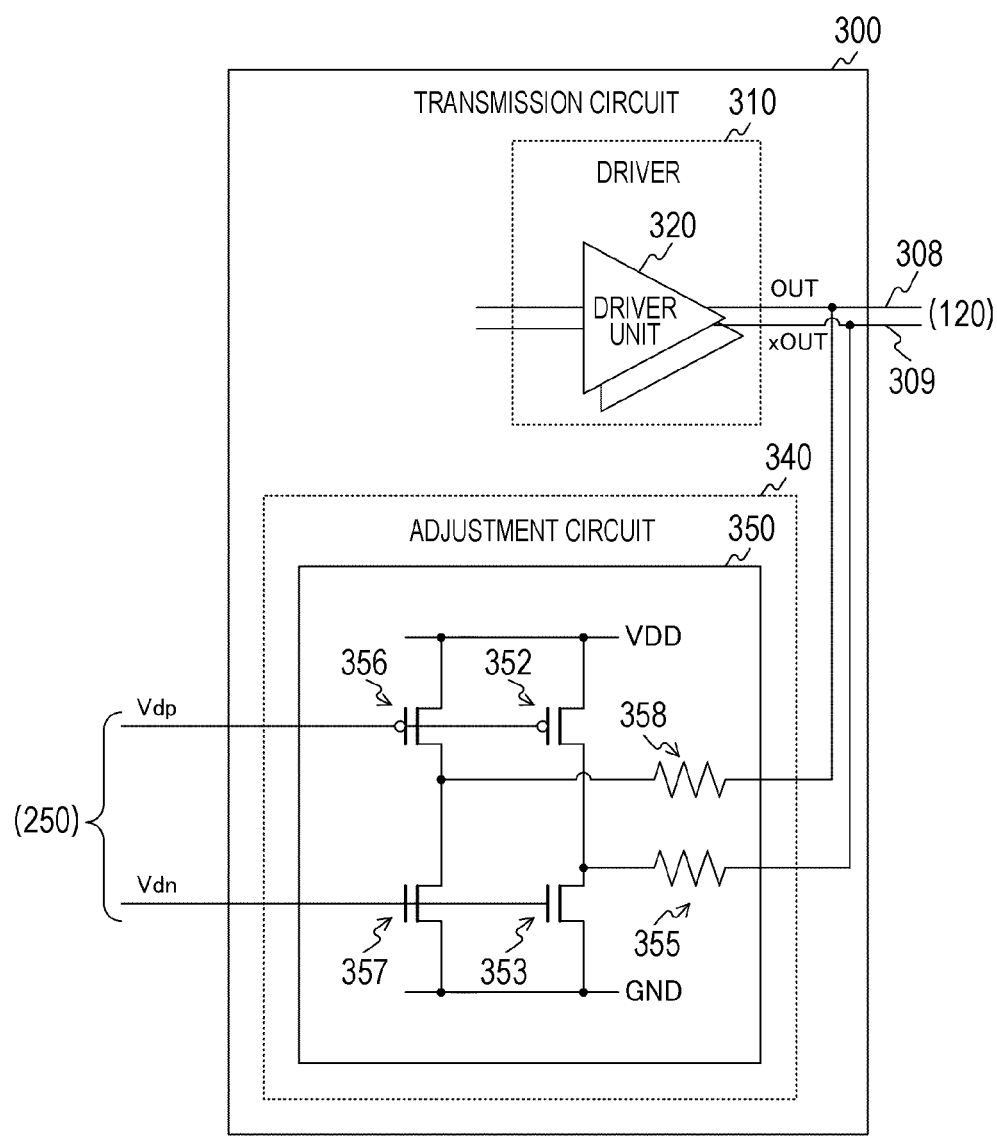
FIG. 25 is a circuit diagram illustrating a configuration example of a transmission circuit in a ninth embodiment of the present technology.

FIG. 25 is a circuit diagram illustrating a configuration example of the transmission circuit 300 in the ninth embodiment of the present technology. The adjustment unit 350 of the ninth embodiment is different from that of the first embodiment in that a pMOS transistor 356, an nMOS transistor 357, and an adjustment-side termination resistor 358 are further provided.

The pMOS transistor 356 and the nMOS transistor 357 are connected in series between a power supply node and a ground node. The positive-side voltage Vdp is input to gates of the pMOS transistors 356 and 352. The negative-side voltage Vdn is input to gates of the nMOS transistors 357 and 353.

A connection node between the pMOS transistor 356 and the nMOS transistor 357 is connected to one end of the adjustment-side termination resistor 358. The other end of the adjustment-side termination resistor 358 is connected to the signal line 308. A connection node between the pMOS transistor 352 and the nMOS transistor 353 is connected to one end of the adjustment-side termination resistor 355. The other end of the adjustment-side termination resistor 355 is connected to the signal line 309.

Note that any of the second to eighth embodiments can be applied to the ninth embodiment.

In this manner, the driver 310 outputs the differential signals according to the ninth embodiment of the present technology, and thus, signal quality can be further improved.

10. Application Example to Mobile Body

The technology (the present technology) according to the present disclosure can be applied to various products. For example, the technology according to the present disclosure may also be achieved as a device mounted on any type of mobile body such as an automobile, an electric vehicle, a hybrid electric vehicle, a motorcycle, a bicycle, a personal mobility, an airplane, a drone, a boat, a robot, and the like.

Figure 26:
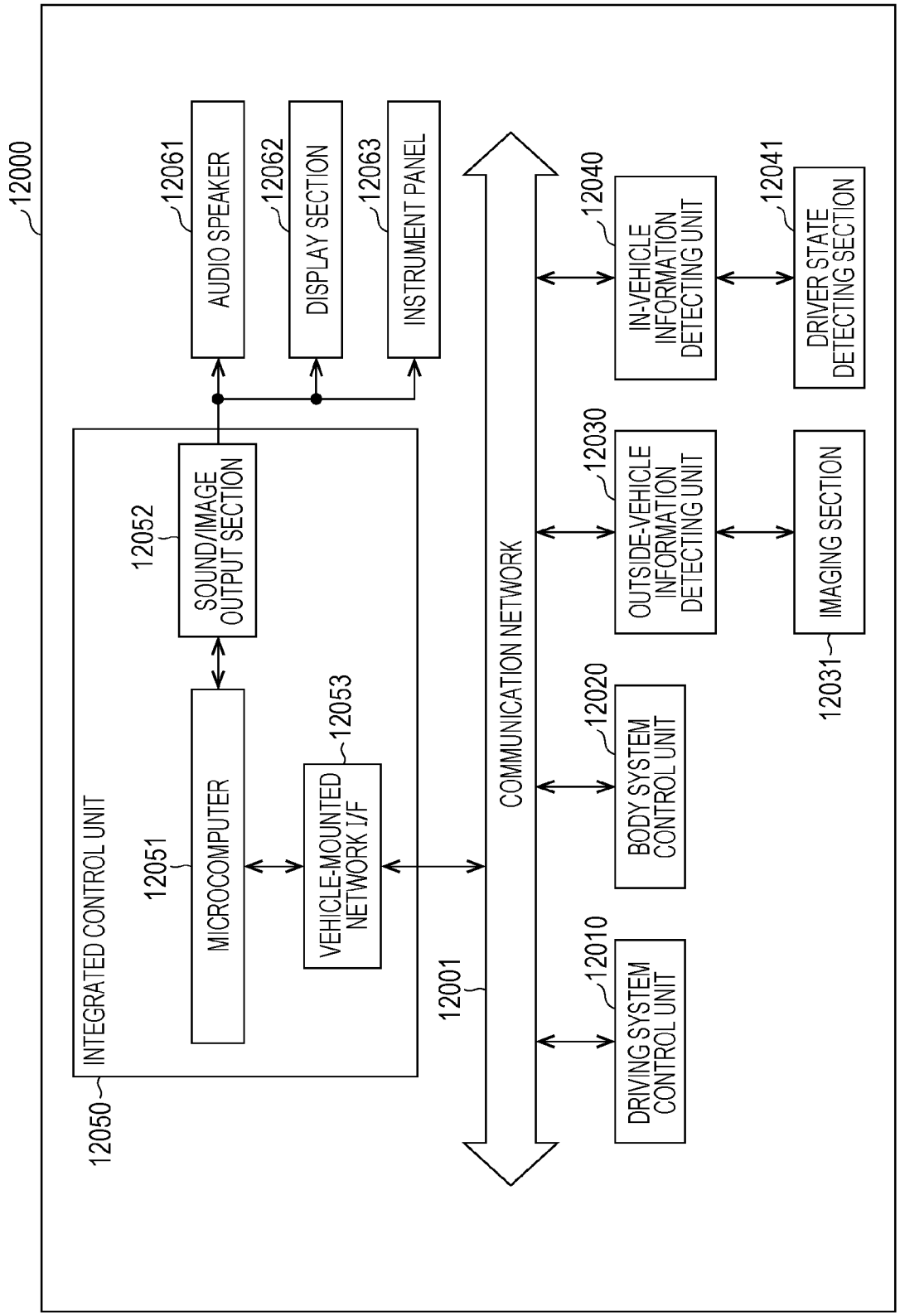
FIG. 26 is a block diagram illustrating a schematic configuration example of a vehicle control system.

FIG. 26 is a block diagram illustrating a schematic configuration example of a vehicle control system as an example of a mobile body control system to which the technology according to the present disclosure can be applied.

The vehicle control system 12000 includes a plurality of electronic control units connected to each other via a communication network 12001. In the example illustrated in FIG. 26, the vehicle control system 12000 is provided with a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example in FIG. 26, as the output device, an audio speaker 12061, a display section 12062, and an instrument panel 12063 are illustrated. The display section 12062 may, for example, include at least one of an on-board display and a head-up display.

Figure 27:
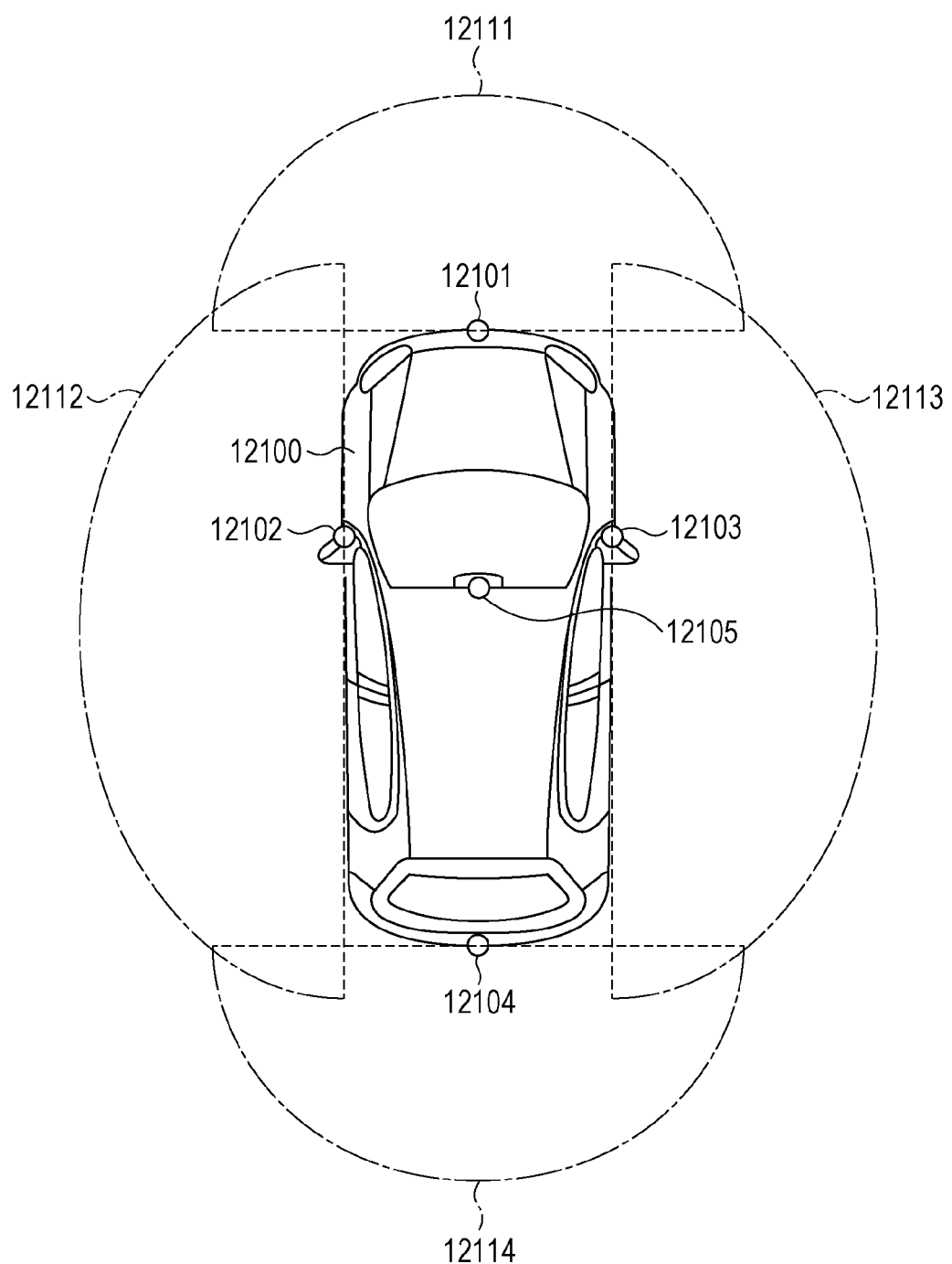
FIG. 27 is an explanatory diagram illustrating an example of an installation position of an imaging section.

FIG. 27 is a diagram illustrating an example of an installation position of the imaging section 12031.

In FIG. 27, imaging sections 12101, 12102, 12103, 12104, and 12105 are provided as the imaging section 12031.

The imaging sections 12101, 12102, 12103, 12104, and 12105 are, for example, provided at positions on a front nose, sideview mirrors, a rear bumper, and a back door of a vehicle 12100, and on an upper portion of a windshield within the interior of the vehicle, and other positions. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 27 illustrates an example of image capturing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied, for example, to the imaging section 12031 among the configurations described above. Specifically, the imaging device 100 in FIG. 1 can be applied to the imaging section 12031. When the technology of the present disclosure is applied to the imaging section 12031, it is possible to improve signal quality and obtain a more easily viewable captured image, and thus, fatigue of the driver can be reduced.

Note that the above embodiments illustrate examples for embodying the present technology, and matters in the embodiments and matters specifying the invention in the claims have correspondence relationships. Similarly, the matters specifying the invention in the claims and matters having the same names in the embodiments of the present technology have correspondence relationships. However, the present technology is not limited to the embodiments and can be embodied by making various modifications to the embodiments without departing from the gist thereof.

Note that effects described in the present specification are merely examples and are not limited, and there may also be other effects.

Note that the present technology can also have the following configurations.

(1) A semiconductor integrated circuit including:
 a driver that outputs an output signal from an output node;
 an adjustment circuit provided with an adjustment-side termination resistor whose one end is connected to the output node and an adjustment transistor connected to another end of the adjustment-side termination resistor; and a control circuit that controls a gate voltage of the adjustment transistor to a value corresponding to a measured temperature.

(2) The semiconductor integrated circuit according to (1), in which the adjustment transistor includes a positive-side adjustment transistor and a negative-side adjustment transistor, the gate voltage includes a positive-side voltage and a negative-side voltage, and the control circuit supplies a voltage, which is higher as the temperature is higher, to a gate of the positive adjustment transistor as the positive-side voltage and supplies a voltage, which is lower as the temperature is higher, to a gate of the negative adjustment transistor as the negative-side voltage.

(3) The semiconductor integrated circuit according to (1), in which the control circuit supplies a voltage, which is higher as the temperature is higher, to a gate of the adjustment transistor.

(4) The semiconductor integrated circuit according to (1), in which the control circuit supplies a voltage, which is lower as the temperature is higher, to a gate of the adjustment transistor.

(5) The semiconductor integrated circuit according to any one of (1) to (4), in which the adjustment circuit includes a plurality of adjustment units commonly connected to the output node, and the adjustment transistor and the adjustment-side termination resistor are arranged in each of the plurality of adjustment units.

(6) The semiconductor integrated circuit according to (5), in which the control circuit further controls a number of units to be driven among the plurality of adjustment units.

(7) The semiconductor integrated circuit according to any one of (1) to (6), further including a power-supply-side regulator that suppresses a fluctuation of a power supply voltage of each of the driver and the adjustment circuit.

(8) The semiconductor integrated circuit according to any one of (1) to (6), further including a ground-side regulator that suppresses a fluctuation of a ground voltage of each of the driver and the adjustment circuit.

(9) The semiconductor integrated circuit according to any one of (1) to (6), further including:

a power-supply-side regulator that suppresses a fluctuation of a power supply voltage of each of the driver and the adjustment circuit; and a ground-side regulator that suppresses a fluctuation of a ground voltage of each of the driver and the adjustment circuit.

(10) The semiconductor integrated circuit according to any one of (1) to (9), in which the driver receives an input of a differential signal as an input signal, and the driver outputs a differential signal as the output signal on the basis of the input signal.

(11) The semiconductor integrated circuit according to any one of (1) to (10), in which the driver includes a plurality of driver units, and a predetermined number of driver units among the plurality of driver units are driven in accordance with a predetermined control signal.

(12) The semiconductor integrated circuit according to (11), in which each of the plurality of driver units includes:

a p-channel metal oxide semiconductor (pMOS) transistor and an n-channel MOS (nMOS) transistor which are connected in series between a power supply node and a ground node; and a driver-side termination resistor inserted between the output node and a connection node between the pMOS transistor and the nMOS transistor.

(13) The semiconductor integrated circuit according to (11), in which each of the plurality of driver units includes:

a pair of nMOS transistors connected in series between a power supply node and a ground node; and a driver-side termination resistor inserted between the output node and a connection node of the pair of nMOS transistors.

(14) The semiconductor integrated circuit according to (11), in which each of the plurality of driver units includes:

a pair of pMOS transistors connected in series between a power supply node and a ground node; and a driver-side termination resistor inserted between the output node and a connection node of the pair of pMOS transistors.

(15) An electronic device including:

a driver that outputs an output signal from an output node;

an adjustment circuit provided with an adjustment-side termination resistor whose one end is connected to the output node and an adjustment transistor connected to another end of the adjustment-side termination resistor;

a control circuit that controls a gate voltage of the adjustment transistor to a value corresponding to a measured temperature; and a reception circuit that receives the output signal.

(16) A method for controlling a semiconductor integrated circuit, the method including:

a procedure in which a driver outputs an output signal from an output node; and a control procedure in which a control circuit controls a gate voltage of an adjustment transistor in an adjustment circuit to a value corresponding to a measured temperature, the adjustment circuit being provided with an adjustment-side termination resistor whose one end is connected to the output node and the adjustment transistor connected to another end of the adjustment-side termination resistor.

REFERENCE SIGNS LIST

100 Imaging device
110 Application processor
120 Reception circuit
200 Solid-state imaging element
201 Pixel chip
202 Circuit chip
210 Pixel array section
220 Signal processing circuit
230 Register
240 Temperature measurement circuit
241 Temperature sensor
242 ADC
250 Control circuit 251 Code converter
252 Conversion table
253, 254 DAC
300 Transmission circuit
310 Driver
320 Driver unit
321, 322, 333, 351, 352, 356 pMOS transistor
323, 324, 326 to 328, 334, 353, 354, 357 nMOS transistor
325, 329 Driver-side termination resistor
355, 358 Adjustment-side termination resistor
340 Adjustment circuit
350 Adjustment unit
360 Power-supply-side regulator
361 Ground-side regulator
12031 Imaging section

The invention claimed is:

1. A semiconductor integrated circuit comprising:
a driver that outputs an output signal from an output node;
an adjustment circuit provided with an adjustment-side termination resistor whose one end is connected to the output node and an adjustment transistor connected to another end of the adjustment-side termination resistor; and
a control circuit that controls a gate voltage of the adjustment transistor to a value corresponding to a measured temperature.

2. The semiconductor integrated circuit according to claim 1, wherein
the adjustment transistor includes a positive-side adjustment transistor and a negative-side adjustment transistor,
the gate voltage includes a positive-side voltage and a negative-side voltage, and
the control circuit supplies a voltage, which is higher as the temperature is higher, to a gate of the positive adjustment transistor as the positive-side voltage and supplies a voltage, which is lower as the temperature is higher, to a gate of the negative adjustment transistor as the negative-side voltage.

3. The semiconductor integrated circuit according to claim 1, wherein the control circuit supplies a voltage, which is higher as the temperature is higher, to a gate of the adjustment transistor.

4. The semiconductor integrated circuit according to claim 1, wherein the control circuit supplies a voltage, which is lower as the temperature is higher, to a gate of the adjustment transistor.

5. The semiconductor integrated circuit according to claim 1, wherein
the adjustment circuit includes a plurality of adjustment units commonly connected to the output node, and
the adjustment transistor and the adjustment-side termination resistor are arranged in each of the plurality of adjustment units.

6. The semiconductor integrated circuit according to claim 5, wherein
the control circuit further controls a number of units to be driven among the plurality of adjustment units.

7. The semiconductor integrated circuit according to claim 1, further comprising
a power-supply-side regulator that suppresses a fluctuation of a power supply voltage of each of the driver and the adjustment circuit.

8. The semiconductor integrated circuit according to claim 1, further comprising a ground-side regulator that suppresses a fluctuation of a ground voltage of each of the driver and the adjustment circuit.

9. The semiconductor integrated circuit according to claim 1, further comprising:
a power-supply-side regulator that suppresses a fluctuation of a power supply voltage of each of the driver and the adjustment circuit; and
a ground-side regulator that suppresses a fluctuation of a ground voltage of each of the driver and the adjustment circuit.

10. The semiconductor integrated circuit according to claim 1, wherein
the driver receives an input of a differential signal as an input signal, and
the driver outputs a differential signal as the output signal on a basis of the input signal.

11. The semiconductor integrated circuit according to claim 1, wherein
the driver includes a plurality of driver units, and
a predetermined number of driver units among the plurality of driver units are driven in accordance with a predetermined control signal.

12. The semiconductor integrated circuit according to claim 11, wherein
each of the plurality of driver units includes:
a p-channel metal oxide semiconductor (pMOS) transistor and an n-channel MOS (nMOS) transistor which are connected in series between a power supply node and a ground node; and
a driver-side termination resistor inserted between the output node and a connection node between the pMOS transistor and the nMOS transistor.

13. The semiconductor integrated circuit according to claim 11, wherein
each of the plurality of driver units includes:
a pair of nMOS transistors connected in series between a power supply node and a ground node; and
a driver-side termination resistor inserted between the output node and a connection node of the pair of nMOS transistors.

14. The semiconductor integrated circuit according to claim 11, wherein
each of the plurality of driver units includes:
a pair of pMOS transistors connected in series between a power supply node and a ground node; and
a driver-side termination resistor inserted between the output node and a connection node of the pair of pMOS transistors.

15. An electronic device comprising:
a driver that outputs an output signal from an output node;
an adjustment circuit provided with an adjustment-side termination resistor whose one end is connected to the output node and an adjustment transistor connected to another end of the adjustment-side termination resistor;
a control circuit that controls a gate voltage of the adjustment transistor to a value corresponding to a measured temperature; and
a reception circuit that receives the output signal.

16. A method for controlling a semiconductor integrated circuit, the method comprising:
a procedure in which a driver outputs an output signal from an output node; and
a control procedure in which a control circuit controls a gate voltage of an adjustment transistor in an adjustment circuit to a value corresponding to a measured temperature, the adjustment circuit being provided with an adjustment-side termination resistor whose one end is connected to the output node and the adjustment transistor connected to another end of the adjustment-side termination resistor.

\* \* \* \* \*